(12) United States Patent
Hamilton et al.

(10) Patent No.: US 7,586,871 B2
(45) Date of Patent: Sep. 8, 2009

(54) PLATFORM AND METHOD FOR PROVIDING DATA SERVICES IN A COMMUNICATION NETWORK

(75) Inventors: Thomas E. Hamilton, Marlborough, MA (US); Chuanfei Chen, Chelmsford, MA (US); Kenneth Gerard Descoteaux, Stow, MA (US); Clifford S. Atwood, Harvard, MA (US)

(73) Assignee: Bytemobile Network Services Corporation, Marlborough, MA (US)

( * ) Notice: Subject to any disclaimer, the term of this patent is extended or adjusted under 35 U.S.C. 154(b) by 748 days.

(21) Appl. No.: 11/330,588

(22) Filed: Jan. 11, 2006

(65) Prior Publication Data
US 2006/0114832 A1 Jun. 1, 2006

Related U.S. Application Data

(63) Continuation-in-part of application No. 10/061,953, filed on Feb. 2, 2002, now abandoned.

(60) Provisional application No. 60/292,564, filed on May 22, 2001, provisional application No. 60/293,756, filed on May 25, 2001, provisional application No. 60/654,730, filed on Feb. 18, 2005.

(51) Int. Cl.
*H04W 4/00* (2006.01)
(52) U.S. Cl. ...................................... 370/328

(58) Field of Classification Search ................. 370/465, 370/338, 352, 410, 356, 349, 401, 389, 254, 370/466; 379/265, 229; 455/433, 432, 427, 455/512, 560; 709/200, 223, 225, 219, 229, 709/224, 206; 707/9
See application file for complete search history.

(56) References Cited

U.S. PATENT DOCUMENTS 6,122,510 A * 9/2000 Granberg .................... 455/433

(Continued)

*Primary Examiner*—Wing F Chan
*Assistant Examiner*—Prenell P Jones
(74) *Attorney, Agent, or Firm*—Finnegan, Henderson, Farabow, Garrett & Dunner, LLP

(57) ABSTRACT

A communication node and corresponding method for processing data communication passing through the node between a first data network and a second data network is described. The method includes detecting an event associated with data communication arriving at the node from the first data network, and determining whether the data communication is to be suspended for service at the node based on the detected event. Suspended data communication is processed based on information in the data communication. Return data communication arriving at the node from the second data network in response to the processed data communication from the first data network is detected. The detected return data communication is allowed to pass through the node without processing the detected return data communication.

36 Claims, 10 Drawing Sheets

U.S. PATENT DOCUMENTS

| | | | |
|---|---|---|---|
| 6,181,703 B1* | 1/2001 | Christie et al. | 370/410 |
| 6,560,327 B1* | 5/2003 | McConnell | 379/229 |
| 6,625,141 B1* | 9/2003 | Glitho et al. | 370/352 |
| 6,888,937 B1* | 5/2005 | Kurapati | 379/265.02 |
| 7,225,249 B1* | 5/2007 | Barry et al. | 709/227 |
| 7,292,844 B2* | 11/2007 | Dowling et al. | 455/414.3 |
| 2002/0059451 A1* | 5/2002 | Haviv | 709/238 |
| 2002/0080771 A1* | 6/2002 | Krumel | 370/352 |
| 2002/0101879 A1* | 8/2002 | Bouret et al. | 370/465 |
| 2002/0131395 A1* | 9/2002 | Wang | 370/349 |
| 2002/0169776 A1* | 11/2002 | Tuunanen et al. | 707/9 |
| 2002/0176404 A1* | 11/2002 | Girard | 370/352 |
| 2002/0191572 A1* | 12/2002 | Weinstein et al. | 370/338 |
| 2003/0182573 A1 | 9/2003 | Toneguzzo et al. | |
| 2003/0192044 A1 | 10/2003 | Huntsman | |
| 2004/0006621 A1 | 1/2004 | Bellinson et al. | |
| 2004/0022237 A1* | 2/2004 | Elliott et al. | 370/356 |
| 2004/0068533 A1* | 4/2004 | Tenhunen et al. | 709/200 |
| 2005/0021796 A1 | 1/2005 | McClain et al. | |
| 2005/0070278 A1* | 3/2005 | Jiang | 455/432.3 |
| 2008/0075099 A1* | 3/2008 | Alao et al. | 370/401 |
| 2009/0077173 A1* | 3/2009 | Lowery et al. | 709/203 |

* cited by examiner

PLATFORM AND METHOD FOR PROVIDING DATA SERVICES IN A COMMUNICATION NETWORK

CROSS-REFERENCE TO RELATED APPLICATIONS

This application is a continuation-in-part of U.S. application Ser. No. 10/061,953 filed Feb. 2, 2002, now abandoned "Platform and Method for Providing Wireless Data Services" which claims the benefit of U.S. Provisional Applications No. 60/292,564 filed 22 May 2001, "Method for Sponsored Packet Switched Data Services on a Wireless Network," and No. 60/293,756 filed 25 May 2001, "Method for Transaction Based Packet Switched Data Services on a Wireless Network," and this application claims the benefit of U.S. Provisional Application No. 60/654,730 filed Feb. 18, 2005, "Platform and Method for Providing Data Services in a Communication Network." Each of these applications is incorporated herein by reference.

BACKGROUND

The invention relates to providing data services in a communication network.

Some data communication systems enable data services for data communication (e.g., data packets) leaving or entering a network end station (e.g., a desktop computer, a laptop computer, a handheld computer, or a cell phone). One technique used to provide data services (e.g., caching and/or content filtering) is to route all data packets coming from or going to the end station through a proxy server. For example, a Web proxy server in communication with an end station can provide a local cache of Web pages and files available on remote Web servers, enabling the end station to access them more quickly and/or reliably. If the end station requests a connection, file, or other resource available on a remote Web server, the proxy server provides the resource from the cache if it is available or, if not, by connecting to the specified server. In some cases, the Web proxy server may alter the end station's request or the server's response for various purposes including content filtering.

SUMMARY

In one aspect, in general, the invention features a communication node and corresponding method for processing data communication passing through the node between a first data network and a second data network. The method includes detecting an event associated with data communication arriving at the node from the first data network, and determining whether the data communication is to be suspended for service at the node based on the detected event. Suspended data communication is processed based on information in the data communication. Return data communication arriving at the node from the second data network in response to the processed data communication from the first data network is detected. The detected return data communication is allowed to pass through the node without processing the detected return data communication.

Aspects of the invention can include one or more of the following features.

The event is detected at communication protocol layers implemented in hardware without the need for assistance from communication protocol layers implemented in software.

The event is detected without requiring processing to terminate or establish a communication session associated with the data communication.

The event is detected at an external node in communication with the node, and the external node suspends the data communication for service at the node based on the detected event.

The external node communicates with the node using commands associated with an application programming interface for the node.

Processing the data communication includes determining whether the data communication should be continued or discontinued.

Processing the data communication based on information in the data communication includes: categorizing request information in the data communication based on a categorization database; and determining whether the data communication should be continued or discontinued based on the categorizing.

Determining whether the data communication should be continued or discontinued is further based on stored metadata.

The request information is categorized after determining whether information in the data communication corresponds to an entry in a list.

Processing the data communication based on information in the data communication includes determining whether the data communication should be continued or discontinued based on whether information in the data communication corresponds to an entry in a list.

The list includes a black list and the data communication is discontinued if information in the data communication corresponds to an entry in the black list.

Discontinuing the data communication includes responding to the data communication with a reply indicating that a request associated with the data communication is denied.

The list includes a white list and the data communication is continued if information in the data communication corresponds to an entry in the white list.

The entry in the list indicates whether the data communication should be continued or discontinued based on a determined identity of a subscriber associated with the data communication.

Processing the data communication includes processing the data communication based on a determined identity of a subscriber associated with the data communication.

Detecting the event includes detecting a request for access to a resource.

The request includes at least a portion of a uniform resource locator.

Detecting the request includes identifying a data packet in a flow of data packets.

Detecting the request includes transforming a request string to generate information identifying the resource.

The request string includes an address corresponding to a cache storing content associated with the resource.

Detecting the request includes detecting a request for access to a resource identified as illegal content.

The request is detected at communication protocol layers implemented in hardware without the need for assistance from communication protocol layers implemented in software.

Detecting the event includes detecting a protocol state based on characteristics of the data communication.

Detecting the event includes detecting a protocol state based on protocol information in a header of a packet of the data communication.

Detecting the event includes detecting a protocol state based on protocol information in a payload of a packet of the data communication.

The protocol information in the payload of the packet includes application layer protocol information.

Detecting the event includes detecting states of a Hyper Text Transport Protocol (HTTP).

Detecting the event includes detecting states of a Wireless Application Protocol (WAP).

The data communication includes a flow of packets.

The flow of packets includes Internet Protocol (IP) packets.

Aspects of the invention can provide one or more of the following advantages.

The system has the ability to determine whether a packet flow should be suspended for filtering a contenst request based on packet flow characteristics detected at the layers implemented in hardware (e.g., layers 2-4 implemented in a network processor) without the need for assistance from higher layers in the architecture implemented in software (e.g., layers 5-7). For example, a "detection point" activates the content filtering in response to a detected protocol state in a packet flow. The system detects a protocol state based on protocol information in a header or payload of a packet. For example, the system is able to detect states of an application layer protocol based on application layer protocol information in the payload of a packet, as described in more detail below. This enables the system to avoid the need to inspect every packet in a flow. Packets that do not meet the criterion for filtering can be forwarded with a short delay (e.g., a few milliseconds or less) of the "fast path" without being processed at higher layers potentially incurring a longer delay (e.g., 10s or 100s of milliseconds) of the "slow path" that includes processing at the higher layers, as in a proxy server. For example, a proxy server may spend time terminating and/or establishing TCP/IP connections in the process of filtering packets. Furthermore, return traffic from a server can be sent directly to a subscriber without necessarily requiring processing by the content filtering service.

The techniques described herein improve efficiency and scalability of the content filtering and other services, in particular for mobile data networks that carry delay sensitive traffic such as voice or video streaming traffic. The content filtering also includes features that increase the reliability of the filtering service such as content request transformation functions which enable categorizing requested content that would otherwise be categorized incorrectly, as in the case of content stored in a web site cache. The ability to apply transformations on the request strings is important for the content filtering to be able to provide complete coverage. More and more users are using content caches or anonymizers to circumvent content controls thereby gaining access to content that would otherwise be inaccessible. The use of these intermediary sites may also be used to violate the laws of certain countries by permitting access to illegal content.

Content filtering can be provided as a service within a network, without requiring content filtering software to be deployed on an individual computer and content controls to be applied by a parent or an enterprise administrator. For example, an internet service provider (ISP) is able to apply content filtering to selected data sessions to comply with legislation of a state or country requiring them to protect children from inappropriate, adult, or otherwise offensive content. Thus, the ISP is not faced with the task of needing to ensure that filtering is applied on end-user computers and that it cannot be improperly removed while serving very large numbers of subscriber sessions.

The fast path packet inspection and detection point techniques substantially reduce the transaction load on the content filtering service over what is found in techniques such as a proxy server. The use of fast path techniques also greatly reduces the latency and service time for each request making the system more suitable for time sensitive applications. Examples of time sensitive network services include push to talk, streaming multi-media, and instant messaging services. Increasing network latency will result in longer service times and subscriber dissatisfaction. The ability to scale to larger number of subscribers on fewer platforms is important since growing subscriber bases and data rates are quickly outpacing the ability of other techniques to keep up with the growth.

The ability to process illegal list inspections in the fast path removes the performance penalties placed on network traffic that occur with techniques using slow path illegal list inspection. Techniques in which each request is handled by a slow path proxy delay all requests when only a small fraction of all requests will actually be to illegal content. For techniques that enable all requests to be handled in the fast path, only those requests that are actually illegal are redirected to the slow path for additional processing.

The availability of an application program interface (API) makes it possible to integrate a Content Filtering Function into an existing network node in cases where it doesn't make sense to add a special purposed node to do so. The API includes functions for handling request transformation mapping, white/override/override list processing, and illegal list processing.

The fast path packet inspection and detection point techniques fundamentally change the architecture typically found when implementing content filtering within a network. For example, some proxy techniques require that all request and response data traverse the complete communication stack twice. The detection point enables an authorization scheme whereby a request is authorized and the response data is sent via the fast path without additional delay. This technique greatly reduces the processing needed to serve a given number of subscribers. The processing time is further reduced when one considers the asymmetric nature of web transactions. Requests tend to be relatively small while response data is quite large in comparison, further enhancing the performance of the filtering system.

The techniques support multiple lists with different functions. White lists and black lists include dimensions for allowing or denying requests on the basis of the identity of an operator, a subscriber group, or an individual subscriber. Qualifying entries of a white list or black list according to the identity of the subscriber enables customization of the filtering service for each individual. Information identifying a subscriber (e.g., a subscriber's name, a mobile phone number, or information characterizing hardware associated with a subscriber such as a MAC address) can be detected and stored upon entry of the subscriber into the network. Further qualifying the entries of a white list or black list with dimensions for operator and subscriber group allows multiple virtual operators or groups to be supported on the same network. Furthermore adding the ability to house illegal and over-ride entries in the same database reduces the number of queries required to process a request thereby improving performance.

Some types of content filtering are directed to Hyper Text Transport Protocol (HTTP) or Wireless Application Protocol (WAP) requests on an Internet Protocol (IP) or a mobile network. The generic packet inspection layer allows detection points to be created for almost any protocol. This functionality when coupled with the request mapper function allows transformations to be made to recognize and/or manipulate the essential elements within a particular protocol to support filtering beyond HTTP and WAP protocols (e.g., protocols such as Simple Mail Transfer Protocol (SMTP), Post Office Protocol (POP), or Real-time Transfer Protocol (RTP)). The use of metadata allows ratings beyond categorization to be used when evaluating profiles relative to the request. For instance, the rules to determine whether a request to download a movie should be allowed might take into account the rating of the movie (as determined by the motion picture association) as well as the download source.

The flexibility and configurability of the system enables the system to be compatible with any of a variety of different content filtering database vendors and service providers.

Other features and advantages of the invention are apparent from the following description, and from the claims.

DESCRIPTION

Figure 1A:
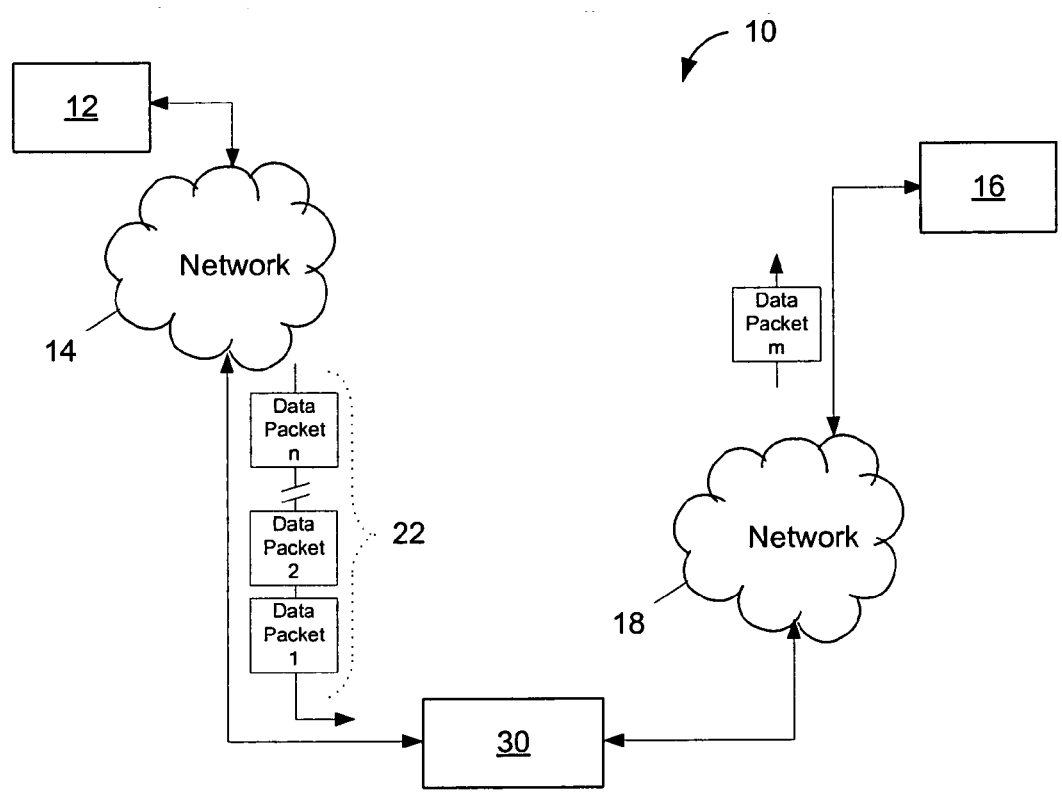
FIG. 1A is a diagram of a communication system for providing data services to a number of end stations.

Referring to FIG. 1A, a system 10 includes a first end station 12 (e.g., a user end station) connected to a first network 14 (e.g., a wireless network) and a second end station 16 (e.g., a server end station) connected to a second network 18 (e.g., the Internet). A service node 30 is in communication with the first network 14 and the second network 18 and is configured to provide a variety of services for the end stations 12, 16. For example, service node 30 receives a flow (or "stream") of n packets 22 from the first end station 12 through the first network 14, and passes the packets 22 to the second network 18 for delivery to the second end station 16. The service node 30 is able to detect an event associated with the flow of packets 22 (e.g., the beginning of a content request) and suspend the flow 22 to perform services based on the detected event. For example, the service node 30 matches a string value (e.g., a URL) associated with the event to a value in a database to determine whether the flow should be continued (e.g., allowing the content request) or discontinued (e.g., denying the content request). Other examples of services that can be provided by the service node 30 include a personalized firewall service, a virus protection service, an email filtering service, and an intrusion detection service.

The service node 30 includes capability that enable features not found in some proxy content filtering approaches. For example, a first approach to content filtering using a proxy service between a client and a server is described below. A second approach to content filtering using a Packet Inspection Function at the service node 30 is also described below. The second approach enables some features not found in the first approach.

A first approach to content filtering is primarily applied to individual computers. A low layer proxy process running on the service node 30 is placed between a client (e.g., a browser running on a client computer) and a content server. The client receives traffic including a request, and parses the request with the goal of categorizing the requested content as being acceptable or unacceptable based on a profile configured for a particular user. The proxy process receives all the packets of a particular request which will typically be forwarded over a peer connection maintained between the proxy process and the content server in the event the profile allows a particular access to requested content. In the event the profile does not permit the requested access, a redirection request may be delivered from the proxy process to the requesting client redirecting the client to a page indicating that the access is not permitted. Unlike a proxy server which performs high layer processing such as TCP/IP session termination and setup, the proxy process does not need to perform such high layer processing. For example, the proxy process is able to send packets indicating a redirection request with the appropriate high layer sequence numbers without needing to establish a new high layer session. There are a number of variations, relative to the client configuration, for where the proxy process may be implemented, for example, as a plug-in within the client, on an edge based appliance, or on a server farm within the operator network.

The proxy process detects return traffic associated with the requested content and allows the detected traffic to pass through the node without processing (e.g., without filtering or other slow path processing). Thus, all of the return traffic passes through the proxy process in the fast path when the content is being served to the requesting client.

The process of categorizing the request to determine if it should be allowed typically involves a number of phases. The first phase is usually a comparison against a white or black list where requests are either allowed or disallowed. Requests not matching an "allow" or "deny" directive are categorized, based on the content (e.g., a web page) being requested, as a result of a query to a categorization database. The resulting category will denote a classification of the content requested which can then be applied to a user profile that may allow or deny content of a particular categorization. The ever changing nature of the World Wide Web makes it unlikely that the categorization database will have an entry for every possible request. As a result, it is possible that a category will not be available and a default action can be defined or the request can be queued for categorization. The categorization process may take many forms including, for example, human inspection, neural networking programs, statistics language processing based on Bayesian or other statistics principles, and/or a combination of multiple techniques, with the end result providing a category to apply against the user profile.

There exists another mechanism that relies on the content being returned from the content server having one or more tags indicating the category of the content being returned. The tags may then be read by the proxy process and applied against the profile provisioned for a particular subscriber. If the returned content is not tagged, it may be inspected and categorized dynamically using categorization techniques, such as those described above, resulting in a category to be applied against the user profile.

The methods of determining whether a particular request is permissible may be applied at the following levels: web domain, page, or a link to an object. Furthermore, the notion of an illegal list may be implemented as a blacklist entry to ensure that potential request targets that have been deemed illegal by the local law enforcement officials may not be accessed.

Figure 1B:
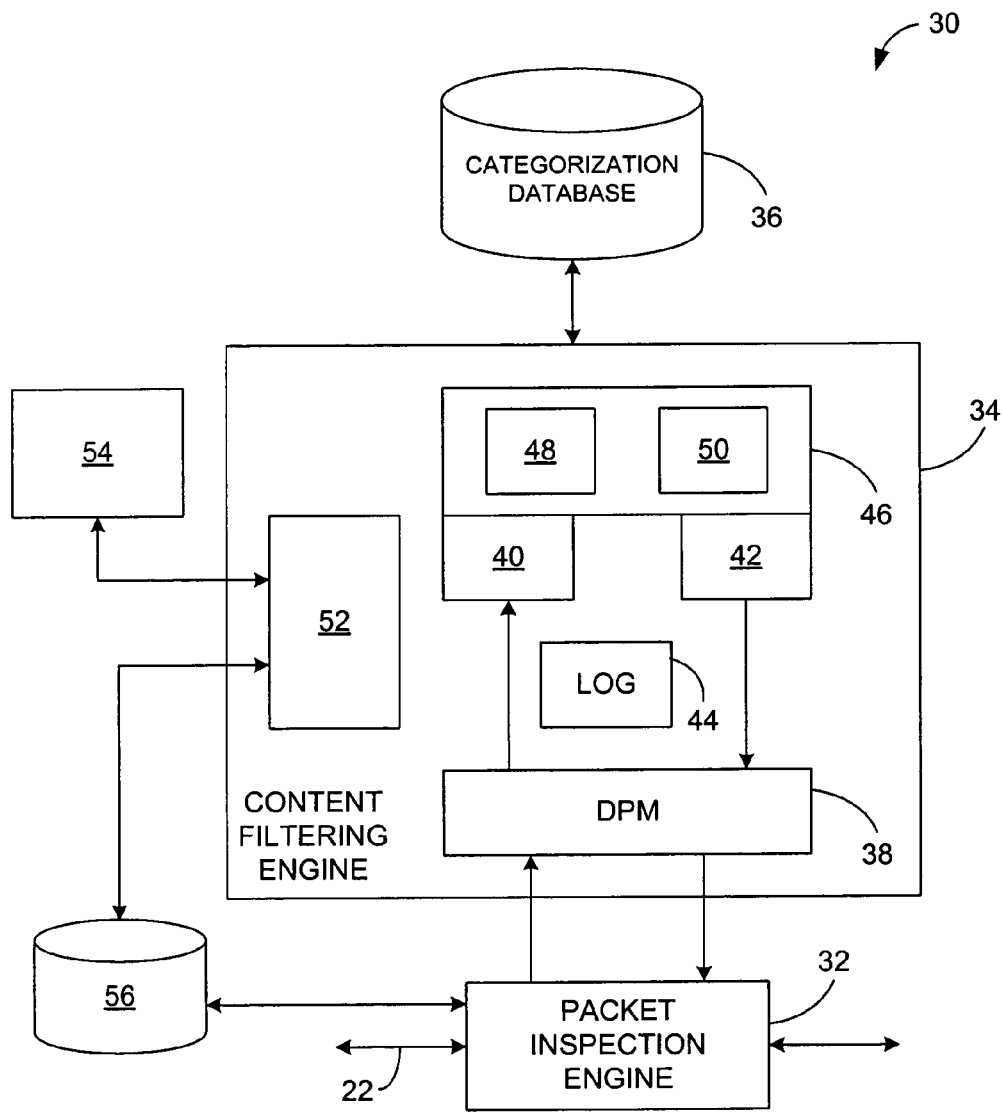
FIG. 1B is a diagram of a service node providing content filtering services.

In a second approach to content filtering function, a Content Filtering Function is implemented in the service node 30 within a carrier or ISP network in cooperation with a Packet Inspection Function. Referring to FIG. 1B, the service node 30 includes a packet inspection engine 32 that provides information characterizing a content request (implementing the Packet Inspection Function), and a content filtering engine 34 that provides a content filtering service based in part on this information (implementing the Content Filtering Function). The Packet Inspection Function examines content requests in real-time and identifies those requests that require additional processing by the content filtering engine 34. Requests requiring the Content Filtering Function are then routed to the content filtering engine 34 for processing. The Packet Inspection Function is performed in the fast path using a hardware based classification coprocessor. Requests requiring Content Filtering Function services are held by the Packet Inspection Function and the Content Filtering Function is notified via an API message which contains the information necessary to make a determination to allow, deny, or redirect the request. The Content Filtering Function will instruct the Packet Inspection Function as to the disposition of the request via an API response. The Content Filtering Function will reach the determination of how a given request will be handled by executing a sequence of steps that will perform various transformations and database queries in an effort to apply a subscriber, subscriber group, operator, or network wide profile to the request to determine if the request is permissible.

In this example, the content filtering engine 34 determines whether to filter a content request based on categorization information provided by a categorization database 36. The "content request" is a request from a subscriber for access to a resource that provides content to the subscriber. For example, the content request may be an HTTP request, a WAP request, or instant messaging request.

The packet inspection engine 32 suspends a flow of packets 22 from the first end station 12 to the second end station 16 after detecting characteristics of the flow 22 that indicates that a communication protocol (e.g., HTTP) is in a particular state. In this case, the detected state corresponds to a content request (e.g., an HTTP GET command). The packet inspection engine 32 inspects a packet in the suspended flow to determine information to characterize the content request (e.g., a uniform resource identifier (URI), or uniform resource locator (URL)), and sends the information to the content filtering engine 34. The information is in the form of an event message (e.g., including the inspected packet tagged with supplemental information). The packet inspection engine 32 provides one or more "detection points" that activate the services of the content filtering engine 34 in response to a detected protocol state in a flow. Examples of such detection points are described in more detail below (in the context of MSSP 260).

The content filtering engine 34 includes a detection point manager (DPM) 38 to interface with the packet inspection engine 32. The DPM 38 communicates with the packet inspection engine 32 to configure detection points that identify content requests from a subscriber or group of subscribers that have been designated to receive the content filtering service. Upon receipt of an event message, the DPM 38 extracts information about the content request (e.g., a URL) from the event message and sends it to a request mapper 40 which uses this information for filtering. The DPM 38 maintains timers for each event message to insure that each request receives a response in a timely fashion. The DPM 38 receives responses indicating whether a particular request should be allowed to continue, or should be suspended or redirected from a profile manager 42. The DPM 38 formats the response for transmission to the packet inspection engine 32 and cancels any associated timers.

The DPM 38 optionally reports the result of a request (i.e., allowed or denied) to a log manager 44. For example, the DPM 38 logs the result of a request if a logging flag is set in the request information. The DPM 38 also reports any protocol errors encountered in communication with the packet inspection engine 32 or the request mapper 40 or the profile manager 42 to the log manager 44.

The request mapper 40 uses the request information received from the DPM 38 to generate a request string that can be used to match the request to a known request string (using the white/black list module 46), or to categorize the request based on the requested content (using the categorization database 36). In some cases, the request mapper 40 transforms the request information received from the DPM 38 into a request string that may be more representative of content that is being requested. If the request information meets a predetermined criterion for one of a set of transformation functions, then that transformation function is used to generate the request string. For example, some web sites (e.g., Google™) may provide a link to content stored in a cache. In that case the request information may include a URL in the form: "http://99.999.999.999/search?q=cache:AbCd99:www.1800flowers.com/+&hl=en." The request mapper 40 uses a transformation function to extract an implied URL: "http://www.1800flowers.com" to include in a request string that is passed to a white/black list module 46. The transformation functions enable the request mapper 40 to handle a variety of caching or island hopping schemes and can be updated (e.g., by updating configuration files) based on changing conventions for redirecting content requests. In some cases, the request information does not meet any criteria for being transformed and is included unchanged in a request string passed to the white/black list module 46.

The white/black list module 46 provides "white listing" and "black listing" functions for quickly identifying content requests that are to be allowed and denied, respectively. If a request string corresponds to a string found in a white list 48, then the content request is allowed. If a request string corresponds to a string found in a black list 50, then the content request is denied. In either case, the white/black list module 46 notifies the profile manager 42 whether the request has been allowed or denied. The request string is formatted to take into account subscriber information such that access to sites can be allowed or denied for all subscribers, on an operator basis, on a subscriber group basis, or on an individual subscriber basis.

For request strings that do not correspond to a string in either the white list 48 or the black list 50, the white/black list module 46 submits information in the request string (e.g., a URL) to the categorization database 36 which replies with an identifier (e.g., a number from 1 to N) describing in which of N categories the content request has been categorized. For example, the categorization database 36 can be provided by a third party vendor (e.g., SurfControl™, from SurfControl Inc. of Westborough, Mass.) that maintains a database of URIs and URLs categorized according to the content that they provide. If the submitted URL is not in the database then the categorization database 36 replies with a default value for "unknown" content.

The profile manager 42 receives one of three responses from the white/black list module 46: an "allow" response, a "deny" response, or a category identifier. If the profile manager 42 receives an allow or deny response (due to a hit in the white list or black list), then the profile manager 42 notifies the DPM 38 which formats the appropriate response for transmission to the packet inspection engine 32 (e.g., Continue, Release, or Redirect, as described below).

If the profile manager 42 receives a category identifier, then the profile manager 42 applies one or more sets of rules to the category identifier, from the most specific rules to the broadest rules. For example, one sequence of scoped rule sets is: subscriber rules, subscriber group rules, operator rules, and default rules. If no subscriber rule exists for a given subscriber, then the profile manager looks for a subscriber group rule, and so on. A rule determines whether a request in a particular category is allowed or denied. For example, if there are 40 possible categories (including an unknown category), a rule may consist of a 40-bit binary string in which a "1" indicates that the request should be allowed and a "0" indicates that the request should be denied. A default rule is applied if no other rules apply to a given request. The various rule scopes enable the filtering engine 34 to apply rules based on a group that a subscriber is associated with (e.g., a Mobile Virtual Network Operator), while maintaining the flexibility to filter content uniquely for individual subscribers.

The log manager 44 is able to store information associated with each content request including whether it was allowed or denied. A log entry can document, for example, the content request made by the subscriber, the result of any transformation on that request made by the request mapper 40, any category assigned to the requested content by the categorization database 36, and the disposition of the request (e.g., allowed, denied, or redirected).

The content filtering engine 34 also includes a management interface 52 that is responsible for configuring various entities within the content filtering engine 34. The management interface 52 also serves as an interface between the content filtering engine 34 and external devices or programs. For example, the management interface 52 is in communication with a provisioning server 54 responsible for configuration updates (e.g., to the transformation functions) and a database 56 associated with the packet inspection engine 32.

Figure 1C:
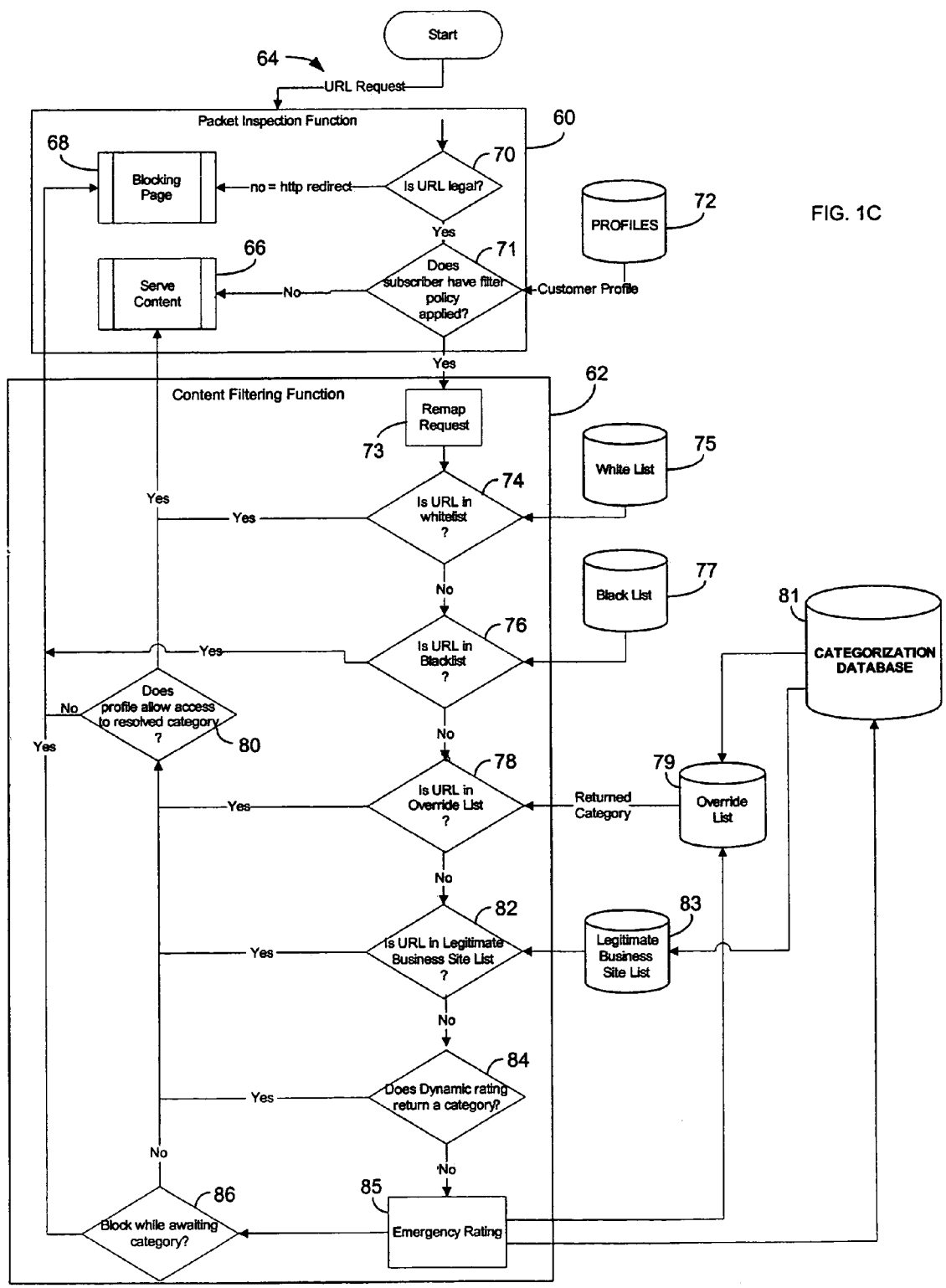
FIG. 1C is a flowchart for a content filtering process.

Referring to FIG. 1C, a flowchart represents an exemplary Packet Inspection Function 60, and an exemplary Content Filtering Function 62 that can be performed using the service node 30. Alternatively, the Content Filtering Function 62 may be invoked via an API from any type of hardware and/or software implementation of the Packet Inspection Function, including implementations using the slow path, and does not necessarily require the fast path packet inspection engine 32 of the service node 30. For example, a device serving as the API client may implement its own Packet Inspection Function. Common examples might include WAP Gateways or GGSN's acting as clients of the Content Filtering Function. The operations in the Content Filtering Function 62 can be implemented independent of the implementation of the Packet Inspection Function 60.

The Packet Inspection Function 60 is responsible for identifying those requests 64 that require the services of the Content Filtering Function 62. The Content Filtering Function 62 will register a "trigger detection point" (or "trigger") with the Packet Inspection Function 60 to suspend the forwarding of a request that requires service from the Content Filtering Function 62. The Packet Inspection Function 60 will inspect all packets passing through the service node 30 to identity those requests that match the trigger or triggers identified by the Content Filtering Function 62. The trigger definition may be qualified to select an individual subscriber, a group of subscribers, or all subscriber requests ensuring that only those subscribers requiring the Content Filtering Function 62 are routed to the content filtering engine 34. Requests not requiring the services of the Content Filtering Function 62 will pass through the service node 30 via the fast path resulting in significantly lower latency than what is typically found in slow path techniques (e.g., less than 300 microseconds for the fast path, versus milliseconds for the slow path).

Once a trigger detection point is hit, a notification will be sent to the Content Filtering Function 62 via an API indicating that a request 64 matching the specified pattern has arrived. The Content Filtering Function 62 will make a decision as to the handling of the request 64 and provide instruction via an API to the Packet Inspection Function 60. The Packet Inspection Function 60 will either forward the previously suspended request to the content server (API Continue Request) to serve the content 66, instruct the client to redirect to an alternate destination (API Connect Request), or drop the request (API End Request) resulting in the failure of the request, and redirect to a blocking page 68. The Packet Inspection Function 60 will set a count down timer upon notifying the Content Filtering Function 62 of a request requiring service. If the timer expires, the Packet Inspection Function 60 will take a default action as provisioned.

The Content Filtering Function 62 is able to register a series of detection points representing all of those sites on an illegal list (e.g., as determined by the local authorities). This will allow attempts to access illegal content to be redirected and/or blocked independent of whether a subscriber is registered to receive content filtering services. This provides a significant improvement over techniques that force all subscriber traffic, including those not subscribed to the content filtering service, through a filtering proxy to ensure that illegal content is not accessible. Alternatively, in cases in which requests originate as a result of the API, the illegal list entries can be detected by the Content Filtering Function 62 using the same database storing the white list, black list, and override list with a type of "Illegal List."

If one or more detection points corresponding to an illegal list have been registered, the Packet Inspection Function 60 determines 70 whether the request (e.g., a URL) is a legal request. If not, then the Packet Inspection Function 60 redirects to a blocking page 68. If the request does target legal content (i.e., the request does not trigger an illegal list detection point) then the Packet Inspection Function 60 determines 71 whether the subscriber has a content filtering applied based on a subscriber profile database 72. If the subscriber does not have content filtering applied, then the Packet Inspection Function 60 allows the content to be served 66. If the subscriber does have content filtering applied, then the request is passed to the Content Filtering Function 62.

The Content Filtering Function 62 remaps 73 the request based on the rules defined for the request mapper 40. As described above, the request mapper 40 applies pattern processing rules to transform the request string before applying the various filtering rules. The transformations are used to identify cases where a straightforward application of the filtering rules would result in behavior contrary to the desired result. These cases are typically encountered when content caches or anonymizers are used. The transformation may be as simple as creating a transformed request string containing an embedded request or it may be more complex where a database is consulted to perform a non-obvious transformation. An example of a non-obvious request might be a user specific URL which has been created dynamically to allow a single subscriber to access content for a period of time. A null transformation may be performed if the input string does not match a transformation rule resulting in the rules being applied to an unchanged request string.

The Content Filtering Engine 62 performs a series of tests on the (potentially transformed) request. A first test determines 74 whether the request is in a white list 75, and if so, allows the content to be served 66. A second test determines 76 whether the request is in a black list 77, and if so, redirects to a blocking page 68. A third test determines 78 whether the request matches a category from an override list 79, and if so, checks 80 the subscriber profile to determine whether to allow the content to be served 66, or to redirects to a blocking page 68.

While logically shown as multiple databases in the flowchart of FIG. 1C, the white list 75, black list 77, and override list 79 can be stored within a single list and/or a single database with each list entry having a type that identifies if the entry is a black, white, or override list entry. As the Content Filtering Function 62 scans through the list entries, a white list entry will allow access to the requested content, a blacklist entry will deny access to the requested content, and an override list entry will return a content category and associated metadata that may be applied directly to the appropriate profile. The override list 79 includes categorization information from a categorization database 81 that can be maintained by the Content Filtering Function 62, or provided by a third party, as described above.

Optionally, other types of lists can be included in the Content Filtering Function 62. For example, another test determines 82 whether the request matches a legitimate business site list 83, and if so, checks 80 the subscriber profile to determine whether to allow the content to be served 66, or to redirect to a blocking page 68.

The list entries are able to be keyed not only by the request strings, but also by subscriber group, individual subscriber, and operator allowing the database to be queried using multiple keys thereby allowing multiple entries for the request string which are further qualified by the operator, subscriber group, or individual subscriber identifiers. Queries to match a request to a single joint master list may return an entry object of type "Illegal List" (in the event the API is in use), "White List," "Black List," "Override List," or "NULL" (i.e., no matching entry found). In the case of type White List the request will be allowed and the Packet Inspection Function 60 will be sent an API Continue Request, while the entries resolving to type Override List will cause the categorization information and meta data to be applied against the profile that governs the request.

Queries to the master list that resolve to type NULL will cause additional queries to be made against the categorization database 81. The categorization database 81 is queried and returns a "category object" to categorize a particular request. Note that this step will be skipped if the resultant entry object from the previous step was of type Override List. This allows the profiles to be built allowing access or denying access to entire categories of content without necessarily having to instantiate a rule for each individual request string. A categorization database query may resolve to one or more category objects, or it may resolve to a NULL object. Category objects and the associated metadata are applied against the governing profile.

In the event a NULL object is returned, one of two actions may be taken based on the configuration of the particular system. If a dynamic categorization engine has been installed, an attempt may be made to dynamically determine 84 the appropriate category object. If the dynamic categorization engine is able to select an appropriate category object and metadata, the category object is applied against the governing profile and the entry is added to the categorization database 81. If a category can not be dynamically determined, the request will be marked for emergency rating 85 (e.g. by manual human review) and a default rule will be applied that will either block or allow access to the requested content 86 until the manual review is complete. If a category is chosen dynamically and the confidence factor is less than 90%, then in addition to making an entry in the categorization database 81 a request will be generated to have a human review the category assigned. It is also be possible to have an emergency rating team that will evaluate the requests designated for human review in real-time. Categorizations made by the emergency team may be added to the categorization database 81 or override list 79 manually.

The determination of whether a request is allowed or denied (with the exception of those requests resolving to White List or Black List hits) is based on the application of the category object to a governing profile. The governing profile is the profile that most uniquely defines the subscriber making a request. In one approach, a request is evaluated in a hierarchal order beginning with operator, followed by subscriber group, and lastly by subscriber if such a profile exists. For a request to be allowed, all profiles in the hierarchy must allow the category. The first profile causing a particular request to be rejected is defined as the governing or overriding profile. Following the evaluation of the profile, the transaction may optionally be logged and the appropriate request is sent back to the Packet Inspection Function 60 to complete the process thereby allowing, redirecting, or denying the access.

Other approaches can be used to determine which rules are applied to a given request. For example, the system can be configured to apply profiles in a "top-down" or "bottom-up" order. The first profile processed that has an explicit rule (as opposed to a default behavior) would govern the request. A carrier is able to decide whether a basic policy is permissive or restrictive, and choose the order in which profiles are applied based on that desired policy. For example, a liberal carrier could apply profiles bottom-up, applying the subscriber profile first, and a restrictive carrier could apply profiles top-down, applying the operator profile first (e.g., enabling requests to be denied at the operator level with no exceptions based on subscriber profiles).

In the following example the service node 30 is a mobile data-switching center that provides services between subscribers in a mobile network and content providers in a non-mobile network. Alternatively, other implementations of the system 10 can provide services between networks any combination of mobile and non-mobile networks.

Figure 2:
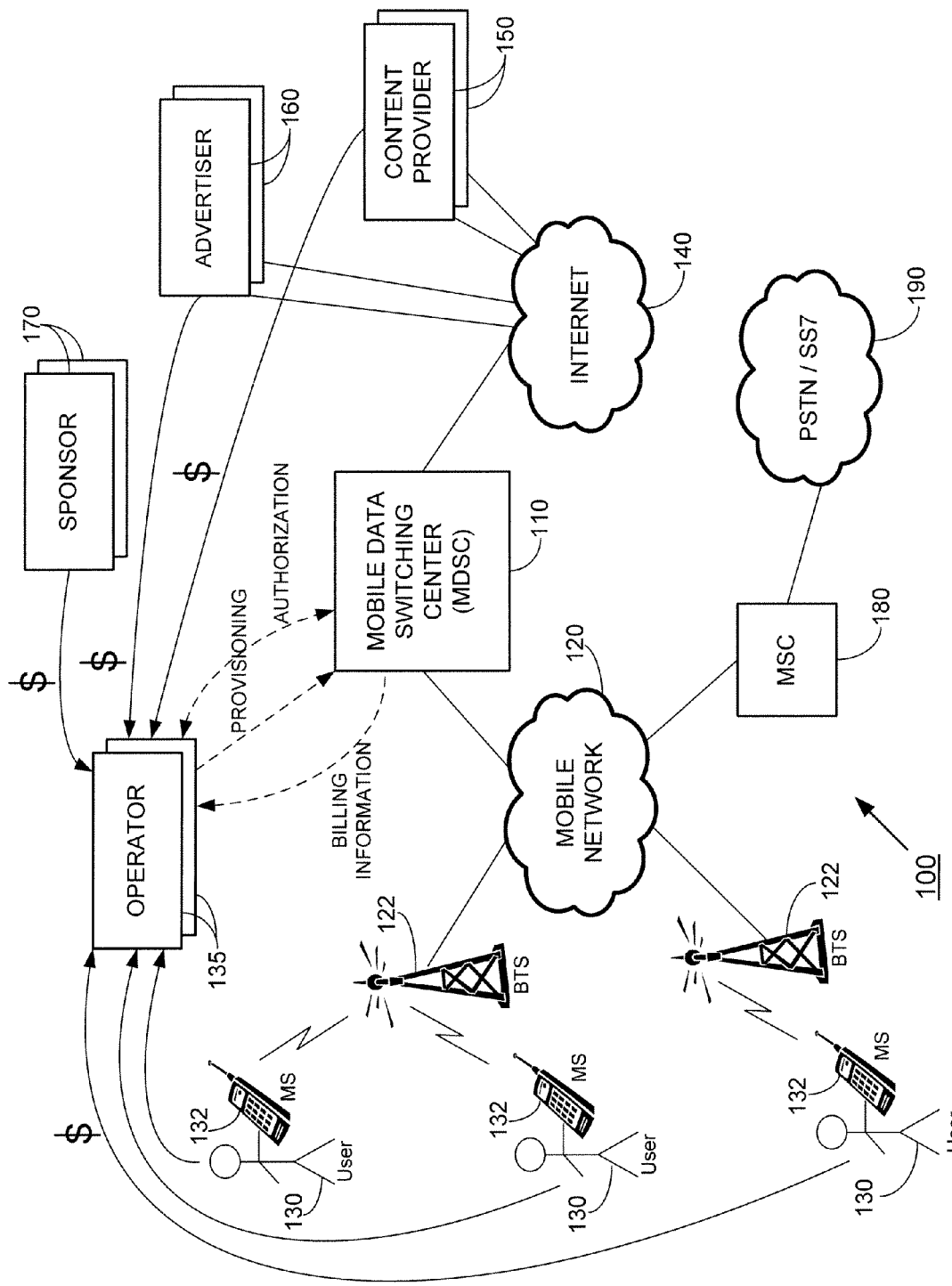
FIG. 2 is a diagram of a wireless communication system for providing data services.

Referring to FIG. 2, in a wireless communication system 100 data communication between a number of mobile stations (MSs) 132, such as wireless cellular telephones, and a number of content providers 150, such as Web servers, is handled by a mobile data-switching center (MDSC) 110. Mobile end stations 132 are operated by mobile users 130 and communicate over wireless links to base transceiver stations (BTS) 122. The BTS 122 are coupled to MDSC 110 over a mobile network 120, which provides a fixed network communication infrastructure for passing communication between MDSC 110 and MSs 132. MDSC 110 is also coupled to content providers 150 over a data network, here over public Internet 140.

Wireless communication system 100 also supports voice communication between MSs 132 and a telephone network, Public Switched Telephone Network (PSTN/SS7) 190, which is controlled by a Signaling System 7 (SS7) infrastructure. A mobile switching center (MSC) 180 is coupled between mobile network 120 and PSTN/SS7 190.

Mobile data switching center (MDSC) 110 provides enhanced handling of mobile data communication sessions between MSs 132 and content providers 150. One type of handling relates to monitoring of the sessions for billing purposes.

One aspect of this monitoring relates to tracking and processing individual sessions that occur while a MS 132 is in data communication over Internet 140. For instance, MS 132 may establish data communication through mobile network 120 for a period of time. MS 132 is assigned an Internet Protocol (IP) address to use for the duration of the period it is in data communication through mobile network 120, and can communicate with other devices over Internet 140 essentially in the same manner as fixed computers coupled to the Internet. Therefore, MS 132 can establish a number of communication sessions with different content providers 150, and these sessions can overlap in time. Examples of content providers include content servers, such as today's Web servers which provide content using HTTP (Hyper Text Transport Protocol) or mail servers that provide mail messages using POP (Post Office Protocol).

MDSC 110 implements a services model for data interactions between MSs 132 and content providers 150. Taken abstractly, a "service" describes the delivery of content or functionality to a user 130, typically in such a way as to provide value to the user. A particular service defines interactions with users and is typically associated with a particular content provider 150.

Operator 135 provisions a number of services of various types on MDSC 110. The system can include an operator 135 of the physical wireless network as well as a number of Mobile Virtual Network Operators (MVNOs). For example, different services may be associated with different content providers 150. A service typically defines charging information to be captured to generate detail records related to use of the service by users 130. The definition of a service may also provide class of restriction information that may be applied against users or groups of users to inhibit or filter a particular service or features associated with a given service, including the content filtering described above. MDSC 110 optionally collects performance and usage metering, which it can provide to operator 135. MDSC 110 creates service detail records (SDRs) to provide a partial or complete summary of a service interaction, which it also provides to operator 135. One use of the SDRs by operator 135 is for billing. Typically a single SDR will be created to summarize a service interaction with a particular user, although partial records can optionally be generated for resource intensive service interactions to ensure that at least partial billing records will be available in the event of a complete system failure. Multiple SDRs can also be generated when the charges for a service interaction are split among several parties, for example, between an advertiser, a subscriber, and a sponsor.

As part of the definition of a service that operator 135 provisions on MDSC 110, an initial detection point specifies the start of an interaction with a user 130 of the service. MDSC 110 monitors and controls many different types of data packets, at a variety of protocol layers, according to state machines each responsible for specific types of packets. Within each state machine there are certain strategic places where important information becomes available or key control decisions can be made. These places are called detection points. A service definition identifies a particular detection point as the initial detection point for the service. When MDSC 110 identifies such an initial detection point in data flowing through it, service logic for the associated service is executed. The service logic typically defines the user interaction with the service for the duration of the interaction. During the service interaction, the service logic registers additional detection points in various of the state machines to gain real-time access to the packet data and to allow it to influence the control decisions made by the state machine. A detection point can be a notification detection point, or a request detection point. The trigger detection point described above can be implemented as a request detection point.

MDSC 110 inspects all data packets passing between the MS 132 and the Internet 140. Between occurrences of detection points for an application, data passes through MDSC 110 without the intervention of the service logic. Therefore, most packets are inspected and passed through MDSC 110 with little or no additional delay due to the inspection. Some packets, such as packets associated with a request for a resource may require additional processing, and may be intercepted and delayed until acted upon by service logic that is implemented in the MDSC or in external service platforms coupled to the MDSC.

MDSC 110 processes data communication at various layers of the protocol stack. For instance, MDSC 110 processes IP, UDP, TCP or other protocols, as well as sessions within higher layer protocols such as HTTP. Furthermore, MDSC 110 processes "sub" sessions of what a user 130 perceives as a "session." For example, when a user accesses a HTML (Hyper Text Markup Language) document on a Web server, this may result in data being sent to the user from a number of different content providers. For example, a separate "sub" session is established between MS 132 and an advertiser 160 to deliver advertising content from the advertiser while the content the user is seeking may come from the content provider. In general, MDSC 110 processes session data at any of layer 2 (data link layer) through layer 7 (application layer) of the standard ISO protocol stack.

Based on monitoring of the communication data passing through MDSC 110, MDSC 110 passes various types of detail records to an operator 135 of the wireless system, typically in "real time" (i.e., with low delay as opposed to periodic batch processing). Different billing policies are applied by the operator to the communication sessions according to the service being performed. The differences in the policies include the basis for the billing, such as a duration of the session, an amount of data transferred during the session, or a number or type of transactions with the content provider carried out during the session. Another difference in the policies includes the payer for the session, which can include one or more of the user 132, content provider 150, or advertiser 160 with whom the user communicated. The payers can also include a sponsor 170 for a session, who may not have been directly involved in the communication with the user. An example of a sponsor is a user's employer.

In addition to monitoring communication data for billing purposes, MDSC 110 monitors the communication for control purposes.

Another example of control of communication sessions is access control involving determining whether a user is authorized to establish a particular session. For example, access control may be based on the user having subscribed to the service to which the user is attempting to be connected. Access control can also be based on a prepayment model in which the user can access the service if they have a sufficient balance in their account. Other types of access control can be based on the user providing credentials (e.g., a password) or agreeing to pay for the service being accessed. The MDSC may communicate with operator 135 to determine whether the user 130 is authorized to establish the session.

Another form of control of communication sessions involves redirection. A user 130 may attempt to establish a communication session with a service, and based on monitoring of that attempt, MDSC 110 redirects the communication to a particular content provider 150. This redirection may involve redirecting a request to establish a communication session with one content provider 150 to another content provider 150. The redirection may also involve redirecting a request to communicate with a "virtual" service to an actual content provider 150. For example, a service may be identified by a name, such as "Flowers" and MDSC 110 redirects the request to a content provider that provides online ordering of flowers. The nature of the redirection is configurable. The redirection can depend on particular characteristics of the user 130 attempting to establish the session, for example, depending on whether they have subscribed to the "Bouquet" service. The redirection can also depend on the characteristics of the mobile station (MS) 132 being used by the user 130, for example, depending on the geographic location of the MS, or the capabilities of the MS device.

These forms of redirection share many characteristics of redirection of telephone calls in an Intelligent Network (IN) based telephone system. For example, if a user dials a toll-free telephone number, such as 1-800-FLOWERS (1-800-356-9377), the call is detected by a telephone switch. An external platform, in particular a Service Control Point (SCP), receives notification of the detected toll-free number and determines the actual telephone number to which to direct the call. In the data service approach described above, the MSSP can request that an external platform determine where to direct a virtual data service.

Figure 3:
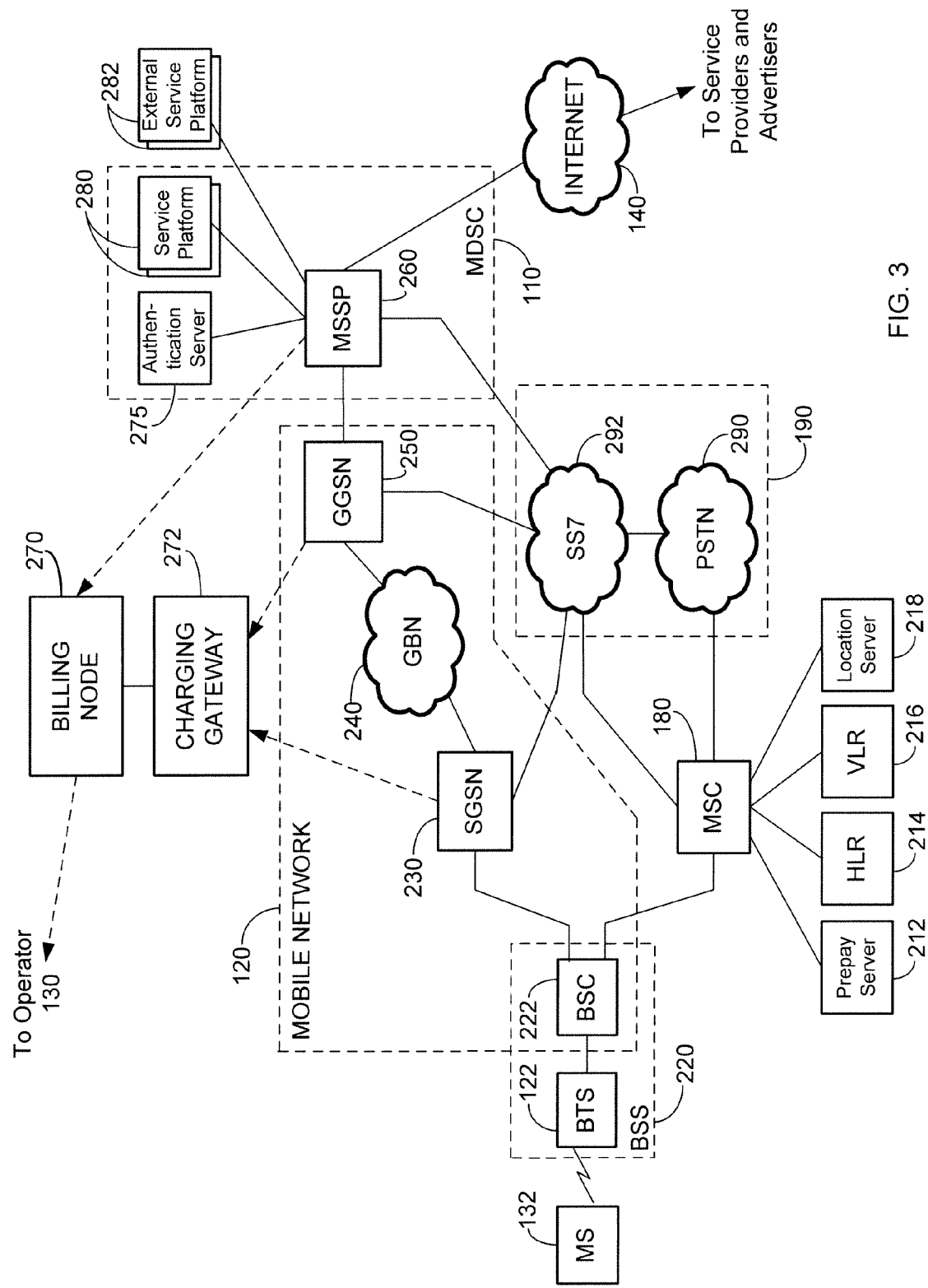
FIG. 3 is a system architecture diagram for the wireless communication system of FIG. 2 in a GSM/GPRS environment.

Referring to FIG. 3, in one version of wireless system 100, the functionality of the system shown in FIG. 2 is implemented in a GSM-based system in which data communication is provided according to the General Packet Radio Service (GPRS) approach. In this version, an additional network element, mobile service switching processor (MSSP) 260 is inserted into an essentially standard GSM/GPRS architecture in the communication path between mobile network 120 and Internet 140. In general, MSSP 260 implements the session monitoring and control functions described in the overview above.

In this version of the system, a Gateway GPRS Support Node (GGSN) 250 provides a gateway for communication between MSs 132 and external networks, such as Internet 140. Within mobile network 120, a Base Station Controller (BSC) 222, which together with one or more BTSs 122 connected to it form a Base Station System (BSS) 220, provides the fixed end of radio communication with one or more MS 132. As a MS 132 travels, even while in voice or data communication with the system, the MS may communicate with a number of different BSS 220, and the system manages this mobility according to standard techniques to maintain communication with the MS.

Voice and data communication from MS 132 is split at a Packet Control Unit (PCU, not shown) of a BSC 222. Voice communication is passed to Mobile Switching Center (MSC) 180 while data communication is passed to a Serving GPRS Support Node (SGSN) 230. MSC 180 sets up voice circuits over PSTN 290 using control communication over SS7 network 292. Control of these voice circuits can include supporting pre-paid voice services in which MSC 180 accesses servers over the SS7 network to determine whether the user 130 has an adequate balance to make the call.

MSC 180 communicates with a number of servers in providing voice communication service. These include a prepay server 212, a home location register (HLR) 214, a visitor location register (VLR) 216, and a location server 218.

Data communication passes between BSC 222 and SGSN 230. In general an SGSN 230 supports multiple BSS 220, and each BSS 220 connects to a single SGSN 230. Each SGSN 230 communicates with a GGSN 250 over GPRS Backbone Network (GBN) 240, which is typically a private data network coupling the SGSN and GGSN nodes.

When user 130 wants to establish data communication from MS 132, the user initiates a request sent by MS 132 to attach itself to the data network. This request is received by BSS 220 and then passed to SGSN 230. SGSN 230 receives the MS identification, typically the International Mobile Subscriber Identity (IMSI) and authenticates the user. The MS requests that the SGSN create a PDP (Packet Data Protocol) Context, which identifies an Internet Protocol (IP) address or indicates that it needs a dynamically assigned address. The SGSN passes this request to the GGSN, which essentially creates the data communication link and acts as a gateway for communication between the MS and an external network. The MS can request a connection to a specified network. In this example, we assume that the MS requests connection to the public Internet. After the PDP context is established, the MS essentially has a virtual link between it and the GGSN, which is providing the gateway function to the external network.

During establishment of the PDP context, GGSN 250 communicates with an authentication server 275, such as a RADIUS server. MSSP 260 detects and monitors the interchange with the authentication server. Using the monitored information, MSSP 260 determines the mapping between the identity of MS 132 and the IP address used by the MS for communication over the Internet. In alternative embodiments, such as those in which authentication is not performed using communication that passes through the MSSP, MSSP 260 obtains the mapping information externally such as over SS7 network 292. For example, MSSP 260 can communicate over the SS7 network to obtain information from the servers 212-218 that are used by MSC 180.

Both SGSN 230 and GGSN 250 create call detail records (CDRs) related to an MS 132 PDP context, which the pass to a charging gateway 272 which performs some processing and matching of the CDRs and forwards billing information to billing node 270. In general, SGSN 230 collects information about the radio portion of the virtual data link between MS 132 and GGSN 250. For instance, the SGSN collects the total duration of the connection and amounts of data sent to or from the MS. In general, GGSN 250 collects information about the external network portion of the communication, including the network connected to (e.g., the Internet), the duration of the PDP context, and the amount of data sent back and forth the external network.

After an MS 132 establishes the virtual data link to GGSN 250, MS 132 is able to initiate communication to Internet 140. For example, a MS 132 may first attempt to contact a Domain Name Server (DNS), which is a computer on Internet 140 that translates a text-based host name into a numeric address. MSSP 260 detects the initial translation request as well as the response.

MSSP 260 monitors all communication between each MS 132 and hosts on Internet 140. MSSP 260 identifies the source MS of each packet according to its source IP address. During the course of monitoring this communication, MSSP 260 generates a number of detail records, which it forwards to billing node 270. By having translated the user's IP address to their IMSI, these detail records directly identify the user's IMSI, MSDN, or both, without necessarily requiring further translation.

As MSSP 260 detects certain points in communication sessions between the MS 132 and destinations on the Internet it generates detail records which it forward to billing node 270. Such detection points can include, for example the initiation or termination of IP flows to particular content providers. Furthermore, as introduced above, MSSP 260 also controls the IP flows and the associated protocol state machines. MSSP 260 communicates with administration and service platforms 280, which are separate computers coupled to the MSSP. These service platforms implement service logic that determines how events in the IP flows that are detected by the MSSP should handled. One or more of these platforms can be co-located with the MSSP and operated as a system forming MDSC 110, which was introduced in FIG. 2. MSSP 260 can also communicate with external service platform 282, for example, over a data network. For example, an external service platform 282 may be operated by a content provider 150 or by a virtual operator.

MSSP 260 is configurable to determine when to generate detail records, and when to block IP flows pending instructions from a service platform 280. This configuration can be statically provisioned. In addition, the configuration can be dynamically created or updated, for example, during the course of processing a communication session, or in response to external events, for example, a user entering a geographic area by the MSSP. The MSSP can optionally obtain this information over a link to the location server.

Figure 4:
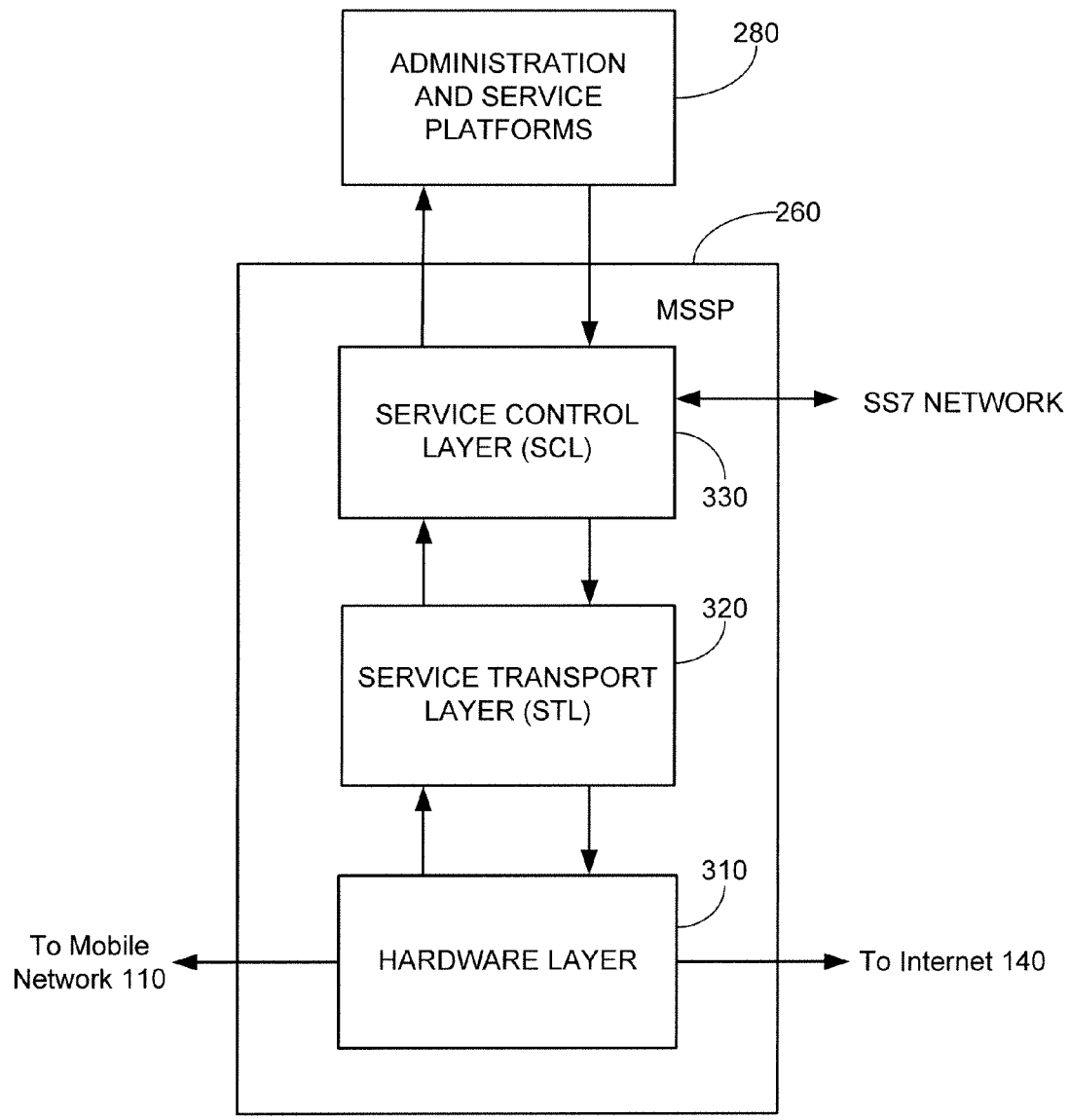
FIG. 4 is a diagram of the logical architecture of a Mobile Switching Services Platform (MSSP).

Referring to FIG. 4, MSSP 260 is architecturally divided into three distinct layers. A hardware layer 310 provides high-speed processing of packets passing between mobile network 120 and Internet 140. Certain packets are identified in hardware layer 310 as requiring further handling, and these are handled by of a Service Transport Layer (STL) 320 and possibly by a Service Control Layer (SCL) 330. When hardware layer 310 does not process a packet itself, it buffers the packet and sends information about the packet (but generally not the packets themselves) to STL 320, and waits for a reply from the STL before further processing the packet.

Hardware layer 310 implements physical data communication interfaces to the external networks, such as mobile network 120 and Internet 140 as well as interfaces to STL 320. The hardware layer also provides the capability to set triggers or event notifications based on IP flow characteristics which the hardware layer detects without the need for software assistance from higher layers in the architecture. Hardware layer 310 is designed to support Quality of Service restrictions on a per user per application basis. The hardware layer implements deep packet processing not only to enable trigger and event processing, but also to analyze data on the fly in real-time. Virtual output queuing system within the hardware layer allows for a fine degree of control that may be used for traffic shaping or policing IP flows. The hardware layer also provides SS7 connectivity.

STL 320 is responsible for managing hardware resources used to route packet traffic between the I/O ports of the MSSP as well as manipulate the various hardware registers that control the flow of data as well as setting triggers and detecting events. STL 320 either processes the information it receives from the hardware layer directly and informs the hardware layer how to process the packet, or passes information about the packets to the third layer, Service Control Layer (SCL) layer 330.

STL 320 is responsible for processing requests originated at SCL 330 related to subscriber sessions and request and notification detection points. STL 320 also implements an IP routing engine used to route packets onto the IP network. STL 320 detects session events and notifies the SCL. The STL controls hardware layer 310 and thereby determines how packet flows are handled. The STL is responsible for managing the hardware registers used to arm both trigger and event detection points and register event notifications.

SCL 330 provides an interface to administration and service platforms 280 and executes service logic associated with provisioned services and interfaces with STL 320 to control hardware layer processing of data passing through MSSP 260. The SCL implements the interface logic and state machines necessary to implement each API. Applications register with an API to set detection points, monitor connection status, and route service requests. The SCL layer will validate and translate API requests to STL requests as necessary to enable detection points and event monitoring. A more detailed description of this type of API can be found, for example, in U.S. patent application Ser. No. 10/100,468 (Publication No. US 2003/0177283 A1), incorporated herein by reference.

STL 320 manages user sessions (i.e., PDP contexts) and different communication IP conversations, such as TCP sessions, within the overall user session. STL 320 also manages and inspects subscriber data packets and implement several types of flows and detection points. STL 320 supports address translation, packet filters, tunneled flows, and supervised flows. STL also counts packets as well as bytes sent and received belonging to any given flow. STL implements detection points on flows. Detection points can be based on individual flow type and can be based on patterns defined using protocol layers 2 through 7. STL will also provide capability to set detection points based on thresholds on the counter values, for example, setting a detection point to occur every 10 kB of data is transferred.

STL 320 provides a capability to limit IP address/port numbers for a given set of session groups. This capability can be used by the SCL to build packet-filtering services and network based firewalls.

STL 320 also provides capability to send packets meeting criteria to a pre-configured tunnel. The criteria are based on IP header and transport layer header characteristics. These flows can be used by SCL to build VPN capabilities.

SCL 330 provides support for the various external MSSP interfaces, such as interfaces to service platforms 280. SCL 330 also implements interface logic and state machines that are used implement each API. The SCL can also communicate over the SS7 network, for example, to obtain information about subscribers. Applications executing on service platforms 280 register with an API to set detection points, monitor connection status, and route service requests. SCL 330 validates API requests from applications and translates them to STL requests, which it passes to STL 320 as necessary to enable request and notification detection points and event monitoring. SCL 330 is also responsible for housing the MSSP configuration database as well as the IP Detail Record (IPDR) database. SCL 330 also provides an interface to external network management systems for provisioning and fault management. The SCL collects data from STL 320, external applications executing on service platforms 280, and API state machines on a per service request basis in order to generate IPDRs for billing or service request statistics, which it forwards to the billing node.

Figure 5:
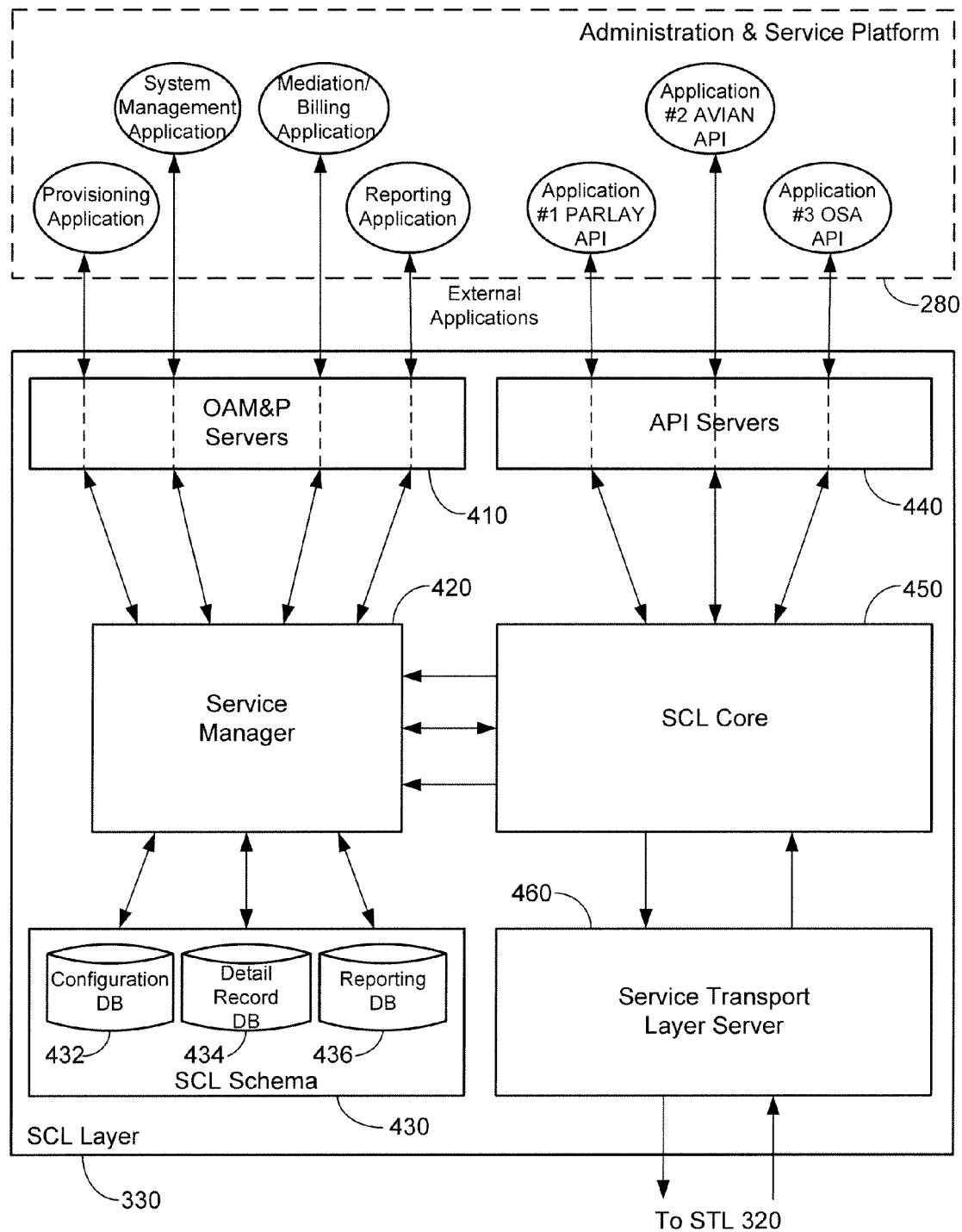
FIG. 5 is a diagram of the architecture of the Service Control Layer of the MSSP.

Referring to FIG. 5, SCL 330 includes modules related to management and monitoring of services as well as modules related to execution of the provisioned service logic.

The SCL is responsible for housing a configuration database 432 as well as the detail record database 434. The SCL also interfaces with external network management systems for provisioning and fault management. The SCL collects data from the STL, external applications, and the API state machines on a per service request basis in order to generate Detail Records (DR) for billing or service request statistics.

A service manager 420 is responsible for managing a variety of service related functions as well as interfacing to the core to perform management functions. OAM&P (Operations Administration Maintenance and Provisioning) servers 410, which include a provisioning server, a network management server, a billing server, and a reporting server, provide interfaces between the operator systems and service manager 420. The OAM&P servers 410 insulate the service manager from the external clients as well as provide the framework necessary to prioritize access to management resources.

One function of service manager 420 is to respond to requests from a provisioning application to create and provision particular services. Service manager 420 creates the service and stores information related to the service in a configuration database 432. Service manager 420 communicates with an SCL core 450 to enable the service so that user sessions for that service are handled by the MSSP.

As part of the provisioning process, an operator can also identify one or more subscriber groups associated with the service. A subscriber group may be used to group users by privileges or by rate plan. Subscriber groups are made up of one or more users who share common properties for billing or network access purposes. A user constitutes an individual subscriber who will have a session with the packet switched network with one or more active flows. The subsections that follow will examine each of these concepts in greater detail. Subscribers are not necessarily individually provisioned in the MSSP.

Service manager 420 communicates with SCL core 450, which generally controls real-time aspects of monitoring and control of service interactions. SCL core 450 is the central runtime component of the SCL software architecture. The SCL core provides an event-based execution environment in which queues of pending message are serviced. The SCL core uses scripts to serve as the sequencer with respect to message processing. The scripts serve as linked lists of calls to compiled code resulting in desirable performance characteristics while maintaining a greater degree of flexibility with respect to specifying system logic. Some messages that are processed by the SCL core are associated with detection points that have been detected in the data flowing through the MSSP. In processing a message, SCL core 450 executes a script associated with the message. Typically script execution is suspended when a request to a remote server is made and a response or acknowledgement is required. A suspended script will later resume execution when the remote server provides the reply or acknowledgement that the originally blocked the script. While suspended other messages are processed by scripts.

SCL core 450 uses a STL server 460 as an interface to STL 320, and uses an API server 440 as an interface to applications executing on service platforms external to the MSSP.

SCL Core 450 calculates statistics of system performance as well as support the generation of detail records. These statistics are updated under the control of scripts executing in the execution environment. Periodically, SCL core 450 exports these calculated statistics to service manager 420, which uses them to compute derived statistics. Service manager 420 calculates system performance statistics based on information it receives from SCL core 450.

A script that implements service logic for a particular provisioned service may control a number of separate data flows. A flow is an abstraction used to describe the movement of packet data through the MSSP. A user may have multiple active flows under the context of a single session. Flows are dynamic in nature and will typically be set up and torn down as the user interacts with the network resources providing the various services. A single flow belongs to a single user under the context of a single service. A flow may also be said to indirectly belong to a particular operator since a user belongs to a single operator subscriber base. Note that a user may have multiple flows active simultaneously that belong to different services. For example, a user may have multiple windows open on a wireless device browsing different web sites each implementing a particular service.

SCL core 450 collects per flow meters that may be further aggregated into per session meters. Flow detail records can be conditionally written when a flow is terminated. Detail records created to provide a partial or complete summary of a flow are known as flow detail records (FDR's). It is possible to create multiple detail records for a single flow. Each detail record contains a sequence number to allow the records to be ordered relative to the order they were written within the context of a given user session or particular flow.

SCL core 450 provides a set of real-time statistics that are sent to service manager 420 for distribution to external processes configured to receive real-time monitoring data. The real-time statistics sent by the core are sent periodically based on the configuration of the MSSP. Real-time statistics may be on a per operator, user group or service basis.

SCL core 450 periodically sends operator real-time records to service manager 420 to provide real-time performance metrics on a per operator basis. The real-time records are typically computed within the SCL core in real-time as messages are processed within the execution environment. A configurable periodic timer initiates the real-time data export process that packages up the real-time data elements and sends them to the service manager for distribution and further computation. Service real-time records and subscriber group real-time records are similarly sent periodically from the SCL core to provide real-time performance metrics on a per service basis. SCL 330 supports a number of detail record formats that will allow data to be captured at a number of levels. These include Application Detail Records, Service Detail Records, User Detail Records, and Flow Detail Records. The service manager computes statistics for intervals of time, for example, for 5 minute, hour or all day intervals and writes these computed statistics to the reporting database.

SCL 330 is able to register and report events on a per flow basis under control of the scripts that execute the service logic. The process begins when a service application registers a notification detection point. The registration process involves setting up a set of patterns that will be matched against flows in real-time. Typically the patterns are keyed off the control messages of the protocol being used at layers 2-7. For instance, a TCP session that is in the process of opening will exchange a number of protocol messages between the two hosts. The exchange of the TCP protocol control messages cause the flow state machine to walk through the connection establishment states. The notion of a detection point begins with identification a set of transitions within the state machine as places where state transitions can be detected and reported to an external application. A detection point can be further qualified with a set of conditions such that only certain flows matching the conditions will be reported to an external application. In practice a detection point is a combination of the specific point within the state machines as well as a set of conditional variables. Event reporting is the process of notifying an external application of when a flow passes one or more detection points and it meets the conditional parameters. The actual events reported are a function of the protocol being implemented. The notion of event reporting is typically most useful for connection-oriented protocols since these types of protocol implement well-defined state machine. Event reporting on connectionless protocols like UDP are not typically very useful as there is not state machine leaving little to report. In many cases the state machine is implemented in a higher-level protocol layered on UDP. An example of a protocol in this class is WAP 1.0. The WAP stack defines an application layer protocol over UDP that implements a state machine. Detection points can be defined on application protocols contained within UDP packets.

A request detection point is a point at which applications can take control of the session while the data communication for the flow is suspended. An application typically registers request detection points at strategic points where it would like to get involved in the connection setup or protocol processing. When a packet within a flow matches all the conditional parameters associated with a detection point, flow processing is suspended and an event message is sent to the application that set the detection point. The application may take actions to change the default handling of the flow. The changes may involve redirecting a connection request to a different destination address or terminating the connection completely. The idea is that the application has the ability to determine how the connection request is routed through the network as well as the ability to configure flow or session parameters for metering or security purposes. An application must respond to a request event in a timely fashion. Failure to do so would potentially cause unnecessary delays as well as a great deal of queuing. If the application fails to respond to the request event within a timeout period (configurable), the suspended flow is resumed and the default actions configured for the service are performed. Request detection points allow an application to selectively interrupt flows to execute service logic that determines how the service is provided. While request detection points are most useful for connection-oriented protocols they may also be applied to non-connection oriented protocol like DNS, DHCP, or RADIUS. In these protocols a request detection point may be used to intercept and serve a request, as well as to synchronize the response with the application running externally to the MSSP. A request detection point might be useful on the response to a RADIUS authentication request since it would notify the application and allow it to send commands to the MSSP to configure the filters for the flow before returning the authentication response. This sequence would ensure that the proper filters were applied to the flow from the start. Note that both types of detection points (request and notification) are typically used simultaneously in a complimentarily fashion to allow the application to control and monitor the interaction.

An example of a request detection point on a TCP Open where the application supplies a destination address in the connect message and asks to receive event reports until the session is established successfully or the session fails because it cannot be established.

The detection point may be registered as a request detection point, or a notification detection point. When a flow encounters a request detection point, packet forwarding will be halted and the SCL Core is notified. The response from the service logic instructs the STL how to proceed and packets in the flow are delivered accordingly. If the detection point was registered as a notification detection point, events will be sent for cases where the packets in the flow match the conditions specified when the notification detection point was registered. Note that the detection point condition string may contain wildcard card characters that may be used to specify a wide range of matching values. Upon receiving the registration request the STL will install the detection point and send a confirmation indicating the success of the registration operation.

The STL allows applications to specify filters to apply to flows on a session (user) or per flow basis. This functionality can be used to filter a flow of packets by comparing a request with white or black lists based on categorization of content, as described above, or to create a walled garden to enforce subscription-based models where subscribers are only allowed to access sites related to their subscriptions. The functionality can also be used to create network resident firewalls. The functionality can be applied dynamically such that if a subscriber where to sign up for a pay per view site an application could update the filters applied to an individual subscriber to give the subscriber access to the functionality for the contracted period. The dynamic nature of the filtering features can also be used to open holes on dynamic ports on command by a media gateway using the API. The operator can therefore ensure that only authorized streaming traffic is allowed on the carrier network. This is in contrast to typical IP routers that allow static access lists to be created to manage packet filtering. The MSSP allows this functionality to be performed by the hardware and the embedded software more efficiently than the user of static lists or the user of an application server software approach. The MSSP access lists will be configurable on a per flow basis, however, it is more likely that access lists will be controlled on a per user or session basis.

The MSSP allows applications to manage VPNs and flows routed over the VPNs within the system. The use of VPNs is on the increase as Internet and network security attacks grow broader in scope. The MSSP is capable of supporting client initiated VPNs as well as NAS-Initiated (Network Access Server) VPNs. The MSSP provides the capability to configure each VPN type and allow applications to control when the VPNs are established and what traffic is routed over the established VPNs. Alternately the MSSP is capable of metering those VPNs that simply pass thru the MSSP from the user client to a remote Internet termination point.

An application associates itself with a detection point by identifying a detection point class, detection point, and the conditions that must exist in order to create a control dialog with the application. Such a detection point is then called an Initial Detection Point (IDP). Traffic passing through the state machine that does not match the given condition criteria is unaffected. When conditions match the given criteria, a control dialog is created between the state machine and the application, and the application is notified of the event.

When the detection point has been armed to provide only an event report, the control dialog only exists long enough to send the event notification, and packet processing by the state machine continues unimpeded. When the detection point has been armed as a trigger, the control dialog persists after the event report, and processing of the packet by the state machine is suspended until a response if received from the application. Triggers allow the application to influence the subsequent control decisions made by the state machine.

For example, in providing the content filtering service described above, the MSSP is able to track subscribers during authentication to determine which subscribers have been designated for a service provided by the application (in this case, a content filtering application run by the content filtering engine 34). The content filtering application configures a detection point to recognize a content request (e.g., an HTTP GET command). As flows from various subscribers pass through the MSSP, the MSSP is able to identify a packet flow that is designated for service by identifying a subscriber (or subscriber group) associated with the flow that has been designated to receive content filtering service.

Packet flows that have been designated for service will encounter a detection point armed as a trigger to suspend the forwarding of the content request and to send an IDP event message to the content filtering application. If a flow contains a content request from a subscriber that has not been designated to receive content filtering service, then the flow will not meet the criteria of the detection point and will be forwarded unimpeded through the MSSP.

When a packet is suspended at a detection point, the application has several different ways to respond. It may simply allow packet processing to be resumed normally, without influencing any control over the state machine (e.g., allowing a content request to reach the designated server). This type of response is called Continue. Another possible response is called Release, which directs the state machine to abort further processing of the packet (e.g., causing a content request to timeout). The application may also provide a new destination for the packet (e.g., a different server) by using a Redirect response. For example, the content filtering application may use a Redirect response to display a customized page indicating why the requested access has been disallowed. Finally, an application may provide state machine-specific control over the state machine's subsequent processing of the packet by using a Control response. The control dialog continues after the application has provided the trigger response only when additional event reports have been requested.

In the case of the content filtering application, even if a subscriber has been designated to receive content filtering service, responses from the server to the subscriber will pass through the MSSP unimpeded, providing a considerable performance advantage over a proxy server based content filtering service.

An application may also use the control dialog created by an IDP to request subsequent event reports from other detection points in the same execution context of the state machine. Event detection points may be requested by an application in conjunction with the Continue and Redirect trigger responses, or they may be requested with a separate Event Report Request message. Event detection points only apply to the state machine context that created the control dialog and do not cause event reports to be generated by any other context of that state machine. Event detection points are automatically removed when the corresponding state machine context is removed.

A control dialog is always created when conditions match arming criteria at an initial detection point. Typically an application will arm only one initial detection point within a given detection point class (state machine) as a trigger, and use the resulting control dialogs to request any additional event reports that are needed by the application. An application may, however, arm multiple IDPs within a given detection point class. Each IDP operates independently of the other, and the resulting control dialogs are distinct. In some cases it may be possible for the application to have multiple concurrent control dialogs established for the same state machine context, but no advantage can be taken of this fact; the control dialogs must still be managed independently as if different applications were involved.

Figure 6:
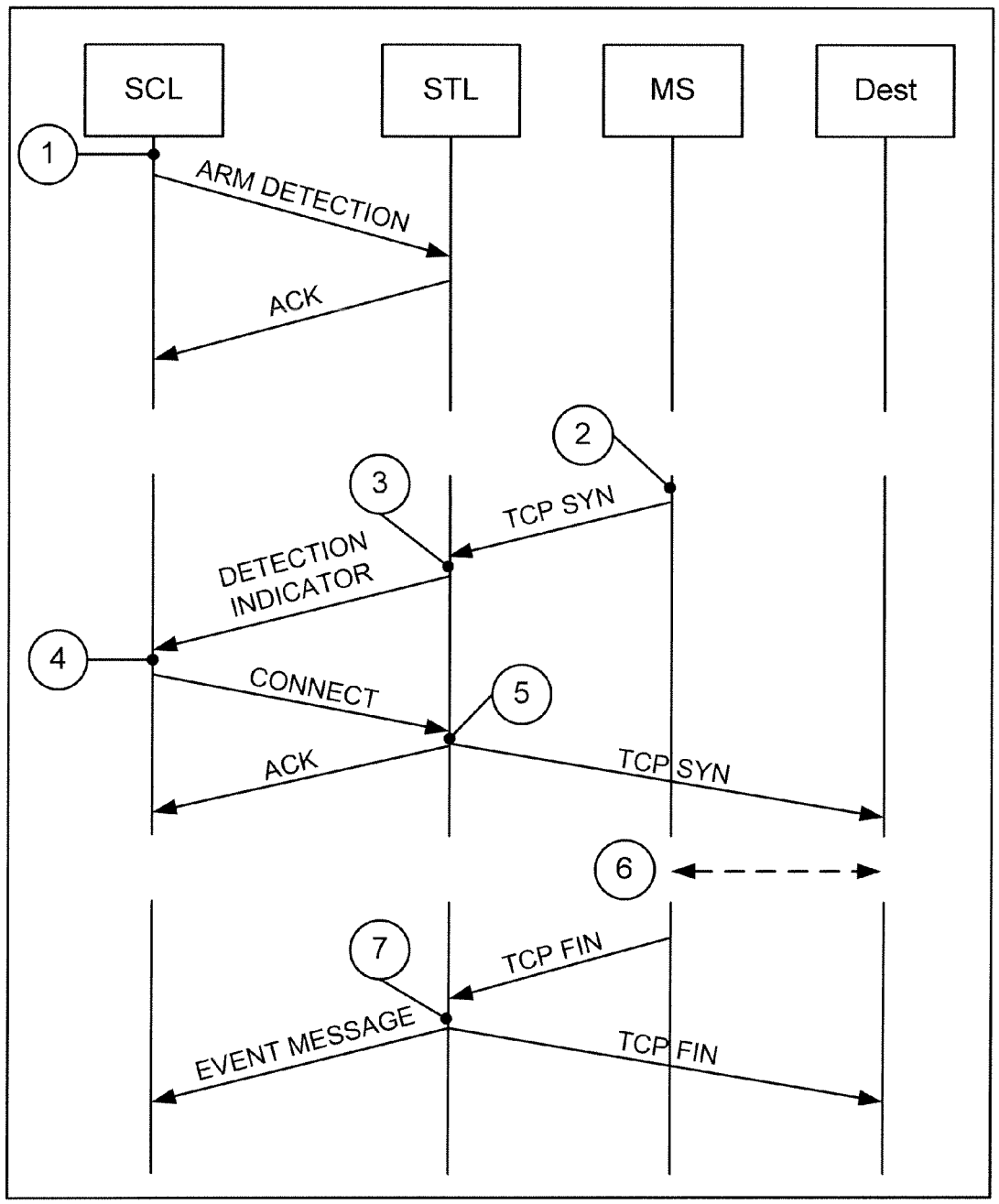
FIG. 6 is a diagram illustrating use of detection points in a TCP flow.

Referring to FIG. 6 a high-level illustration of the detection point message flow for a hypothetical application that is to control TCP connections to a specific destination address:

1. Application in the SCL arms a detection point associated with the detection of a SYN packet, which is associated with the creation of a TCP flow. The detection point criteria identify the target destination address to be controlled.
2. The Mobile Station (MS) initiates a TCP connection to the target destination address, causing a TCP SYN packet to be sent towards the target destination address.
3. As the TCP SYN packet transits the MSSP, the TCP state machine in the STL evaluates the conditions at the TCP SYN state detection point and finds a match with the arming criteria stored by the SCL at step 1. Processing of the SYN packet is suspended and an initial detection point indication is sent to the SCL to initiate a control dialog with the SCL.
4. SCL evaluates the data provided by the detection event indication and determines that the TCP connection should be directed to a different destination. It responds to the STL with the address of different destination and requests to be informed when the TCP connection is terminated.
5. The STL acknowledges the connection request, forwards the TCP SYN packet on to the new destination, and arms the TCP connection termination detection point to provide an event report for this connection.
6. The new destination and the mobile station (MS) complete the TCP protocol to open a connection and exchange data.
7. The mobile station (MS) initiates the TCP disconnect procedure, causing a TCP FIN packet to be sent. As the FIN packet transits the MSSP, the TCP state machine in the STL Entity evaluates the conditions at the TCP FIN detection point and finds a match with the arming criteria stored by the SCL at step 5. The requested Event Report Indication is sent to the SCL. Since this detection point was armed as an event report and not a trigger, processing of the TCP FIN packet proceeds and the packet is forwarded on to DEST, and the TCP protocol to close the connection is completed.

In this example, the detection point was associated with a TCP state machine. The STL layer includes a number of state machines including: load monitoring, Session Group, Subscriber session, RADIUS protocol, DHCP protocol, DNS protocol, TCP protocol, and IP protocol The criteria that specify the characteristics of a IP detection point include: Operator ID, Subscriber Group ID, Session ID, Source IP Address. Source IP Port number, Destination IP Address, Destination IP Port number, and application.

Figure 7:
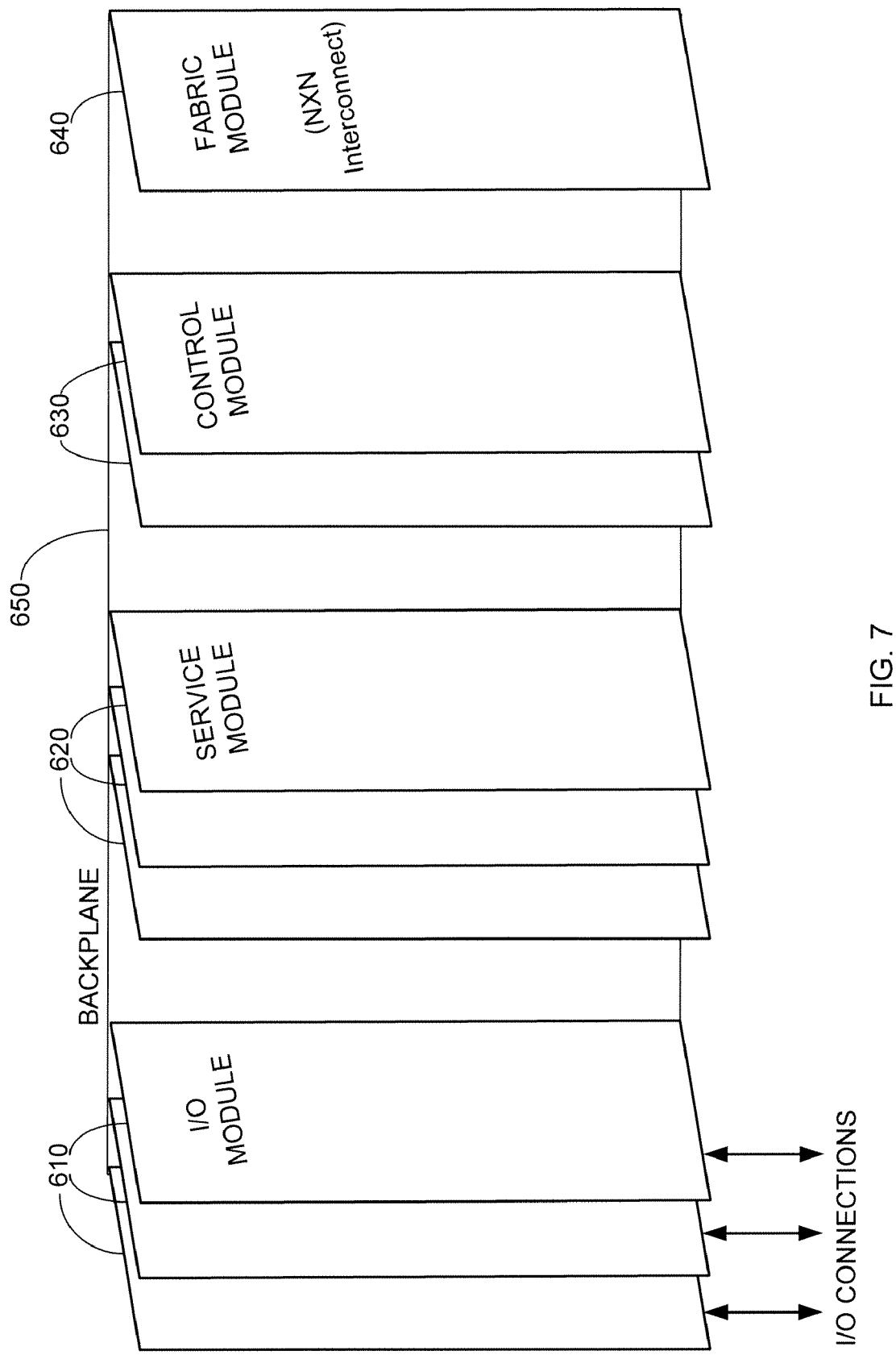
FIG. 7 is a diagram of the physical architecture of an MSSP.

For the TCP state machine, detection points that can be registered include: FORWARD_SYN, REVERSE_SYN, TCP_ACK, FORWARD_FIN, REVERSE_FIN, and RESET Referring to FIG. 7, MSSP 260 is chassis based with a backplane 650 connection a number of different modules. There are four module types: an I/O module 610, a service module 620, a control module 630, and a fabric module 640. Optionally, there are redundant control, SS7, I/O and fabric modules in the system. The number of I/O modules 610 is dependent upon the external connections needed of the wireless system in which the MSSP is used. The number of service modules 620 is generally dependent upon the number of subscribers as well as the number and complexity of the services the MSSP needs to support. I/O modules 610 and service modules 620 are not necessarily associated in a one-to-one relationship. Control module 630 can alternatively be external to the chassis or may be in a mixed configuration in which case some functionality is provided on internal control module 630 and associated functionality is provided in an external computer. All module types can be replicated for one to one redundancy. For example there can be two fabric modules in the MSSP.

Fabric module 640 provides an N-by-N interconnection for the other modules, whereby any module can pass packet data or other information directly to another module.

Control module 630 provides a platform for hosting software-based layers of the MSSP architecture. In this version of the system, the control module uses a Sun Microsystems SPARC based processor.

I/O modules 610 and service modules 620 perform hardware-based processing of data packets. The typical data path for a packet is input to the MSSP at an I/O module 610. The I/O module sends the packet through fabric module 640 to a service module 620. The service module either immediately processes the packet and sends it to an I/O module 620 for egress from the MSSP, or holds the packet for further processing.

If service module 620 needs to communicate with the software-based SCL, it passes messages through fabric module 640 to control module 630 which hosts the software layers. Control module 630 implements a TCP/IP communication stack. If SCL 330, which executes on control module 630, needs to communicate with a service platform 280, it passes such communication through the TCP/IP stack and through fabric module 640 to an I/O module 610 which provides an interface with the service platform.

Figure 8:
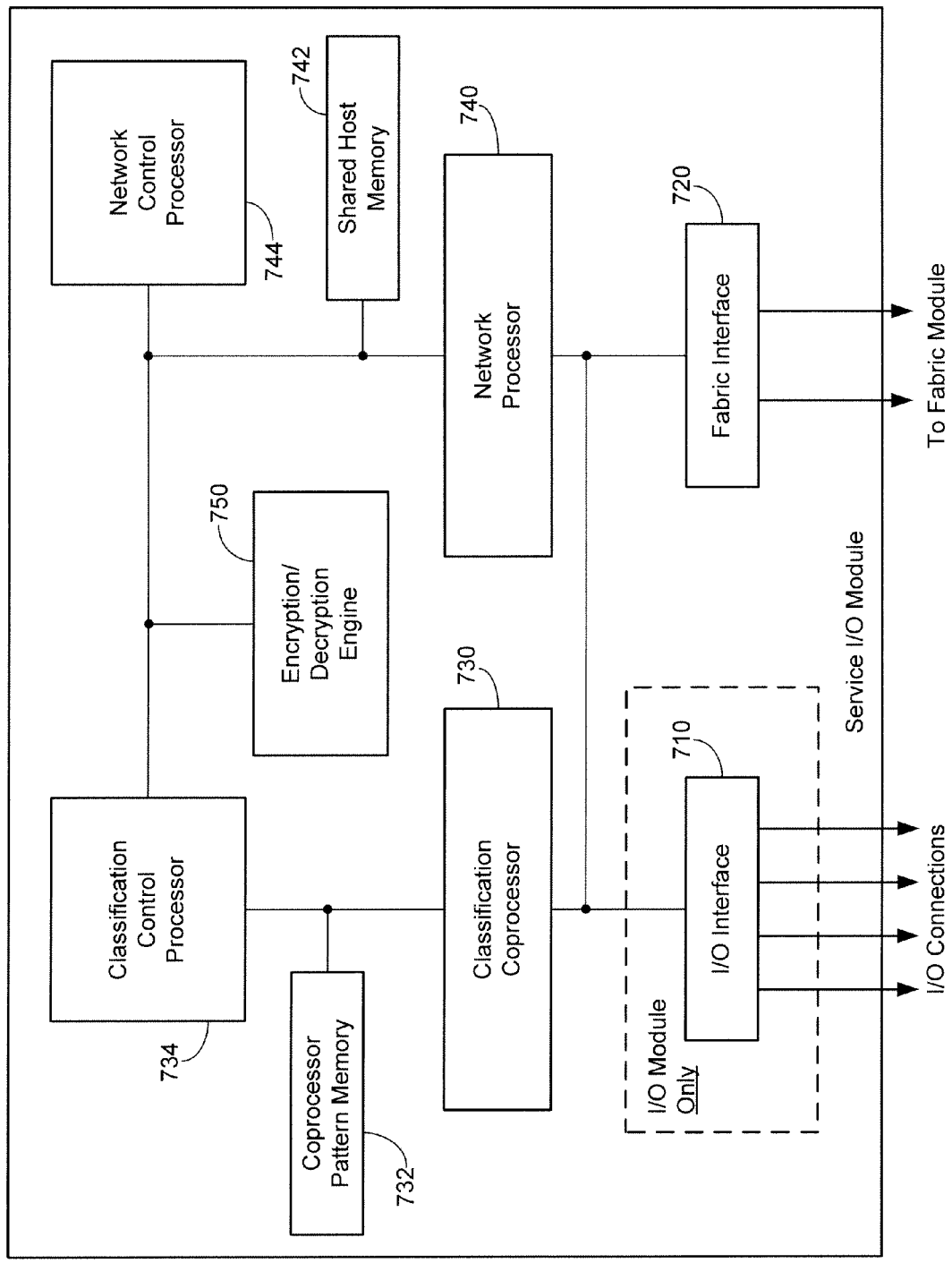
FIG. 8 is a block diagram of a I/O module and a service module of an MSSP.

Referring to FIG. 8, I/O module 610 and service module 620 share a common hardware architecture. A fabric interface 720 provides a communication path to fabric module 640 for passing data to other modules in the backplane. In this version of the system, fabric interface uses a Gigabit Ethernet (GE) to communicate with fabric module 640. A network processor 740 communicates with fabric interface 720 and receives packets that are passed to it through fabric module 640. In this version of the system, network processor is an Intel IXP 1240 processor. Network processor 740 is controlled by a network control processor 744 and makes use of a shared host memory 742, which is shared between the network control processor and the network processor.

I/O module 610 also includes an I/O interface 710. A service module 620 does not need to include this interface, or if present, does not typically make use of it. I/O interface 710 provides external data connections for the MSSP. For instance, data passes between the MSSP and mobile network 120 and between the MSSP and Internet 140 over such an I/O interface. Packets pass directly between I/O interface 710 and network processor 740.

A classification coprocessor 730 "snoops" on data packets passing between network I/O interface 710 and fabric interface 720 and network processor 740. Classification coprocessor is configured to detect particular types of packets by detecting characteristics of those packets at any protocol level. The patterns that the classification coprocessor detects are stored in a coprocessor pattern memory 732, which is set a classification control processor 734. When classification coprocessor 730 detects a particular type of packet is it looking for, it informs network processor 740 with little delay after network processor 740 has received the packet. In this version of the system, classification coprocessor 730 is manufactured by Solidum Systems, and provides detection of packets based on regular expression specifications. These regular expressions can involves features of the packet at one or more protocol layers.

Software layers of the MSSP architecture, which execute on control module 630, set the packet patterns (i.e., detection points) to be detected by communicating with classification control processor 734 through fabric module 640, fabric interface 720, and network processor 740.

Service module 620 also includes an encryption/decryption engine 750, which is used by the service module for maintaining tunnel connections to external services. For example, communication between MSSP 260 and a content provider 150 may be over a secure tunnel. The encryption/decryption engine implements the encryption and decryption needed in hardware.

A typical path for a packet flowing from mobile network 120 to Internet 140 enters MSSP 260 through an I/O interface 710 on an I/O module 610. The packet passes to network processor 740 on the I/O module. Network processor 740, possibly aided by classification coprocessor 730, determines whether the packet is part of a communication session with a Mobile Station (MS) 132 that is supposed to be managed by the MSSP. If it is, network processor 740 passes the packet directly to a service module 620 through fabric interface 720 and fabric module 640. The packet enters the service module through its fabric interface 720 and passes to network processor 740 on the service module. Classification coprocessor 730 snoops on the packet passing from fabric interface 720 to network processor 740. If the packet matches a pattern that the classification coprocessor is configured to detect, the packet coprocessor informs the network processor 740 and network control processor 744.

If the packet does not need to processing by software layers of the architecture, network processor 740 send the packet out fabric interface 720 to an I/O module for transmission out of the MSSP. The I/O module receives the packet, which is passed through network processor 740 to I/O interface 710 and out of the MSSP.

If the packet is associated with a detection point at which intervention of a software layer of the architecture is required, network processor 740 on the service module does not immediately send out the packet. Rather, network control processor 744 communicates with the software by communicating through the fabric module to the control module where the software is hosted. The network control processor eventually receives a response from the software layer, and controls the network processor to handle the packet appropriately. If a response does not come within a configured period, the packet is handled using default processing rules.

If the packet is associated with a detection point that does not require suspending the packet but does require notification of the software layers, network control processor 744 sends a message to the control module and network processor 740 passes the packet on to the appropriate I/O module without waiting for instructions from the control module.

Operation of MSSP 260 uses models, such as finite state models, to monitor communication sessions between the Mobile Stations (MSs) 132 and content providers 150. MSSP 260 is configured to enable detection points at transitions in these call models, for example at states or state transitions of finite state models. The call models occur at various protocol layers. For instance, at a lowest layer, a call model is associated with an entire PDP context. At higher layers, call models are associated with transport layer flows, such as TCP flows. The states of the call model relate to the initial establishment and then termination of the flows. At still higher protocol layers, call models are associated with application layer interchanges, for example associated with communication sessions following the HTTP protocol.

Service logic, which may execute on a service platform 280, on an external service platform 282, or on the control module internal to the MSSP, registers particular detection points of which it requests to be notified or at which it requests to receive control of the session. The detection point is typically identified by a particular state or state transition in one of the call models, as well as by parameters of that detection point. An example is setting a detection point when a TCP session is attempted to be established to a particular IP address, or when an HTTP session requests a particular Web page.

The SCL of the MSSP, which executes on a control module in the backplane, receives the request to register a detection point, an issues corresponding requests of the STL, which in turn requests configuration of the network processor and classification coprocessor on a service module.

In alternative hardware configuration, rather than using a backplane with a fabric card, a single combined I/O module and service module provides external data connections and packet processing. This combined card is hosted in a computer chassis, such as a "pizza box".

In other embodiments, an MSSP is used to provide Voice over IP (VoIP) services in which packetized voice traffic is passed between the mobile network and the fixed network.

In alternative embodiments, the approach described above is applied to Mobile Virtual Network Operator (MVNO) environments. In one such environment, multiple operators share a single MSSP. Services, user groups, and other configuration are done on a per-operator basis. In this way, data communication between a subscriber of one virtual operator is handled by services for that operator. That is, a flow for a subscriber only triggers services provided by that operator. The operator of the physical network can receive usage information, for example, to bill the virtual operators for their use of the physical network. The virtual operators receive detail records for their subscribers so that they can bill their subscribers, service providers, and advertisers on a service model basis. In another MVNO environment, one MSSP may route communication for a particular virtual operator to another network location, for example, to another MSSP, without processing the flows.

In alternative embodiments, different types of wireless architectures than GSM/GRPS are supported. For instance, the MSSP described above can serve as a gateway for a variety of different types of wireless data networks, including CMDA, TDMA, and third-generation (3G) systems.

Also, in the GSM/GPRS case, the functionality of the MSSP can be combined with other nodes. For example, the functionality of a GGSN and an MSSP can be combined into one node.

An MSSP can also control communication that does not involve a wireless data network. For example, the model approach with external service platforms is applicable to monitoring and controlling communication sessions passing between networks, such as between a subscriber's network and a wide area backbone network, or between a wireless LAN and a fixed network.

Various alternative hardware architectures are also feasible. For example, in alternative architectures, the functionality of the I/O modules and service modules could be combined, and more or less of the functionality supported on the control module can be hosted with the MSSP chassis.

It is to be understood that the foregoing description is intended to illustrate and not to limit the scope of the invention, which is defined by the scope of the appended claims. Other embodiments are within the scope of the following claims.

What is claimed is:

1. A method for processing data communication passing through a node between a first data network and a second data network, the method comprising:
    detecting an event associated with data communication arriving at the node from the first data network;
    determining whether the data communication is to be suspended for service at the node based on the detected event;
    processing suspended data communication based on information in the data communication; and
    detecting return data communication arriving at the node from the second data network in response to the processed data communication from the first data network, and allowing the detected return data communication to pass through the node without processing the detected return data communication.

2. The method of claim 1, wherein the event is detected at communication protocol layers implemented in hardware without the need for assistance from communication protocol layers implemented in software.

3. The method of claim 1, wherein the event is detected without requiring processing to terminate or establish a communication session associated with the data communication.

4. The method of claim 1, wherein the event is detected at an external node in communication with the node, and the external node suspends the data communication for service at the node based on the detected event.

5. The method of claim 4, wherein the external node communicates with the node using commands associated with an application programming interface for the node.

6. The method of claim 1, wherein processing the data communication comprises determining whether the data communication should be continued or discontinued.

7. The method of claim 1, wherein processing the data communication based on information in the data communication comprises:
    categorizing request information in the data communication based on a categorization database; and
    determining whether the data communication should be continued or discontinued based on the categorizing.

8. The method of claim 7, wherein determining whether the data communication should be continued or discontinued is further based on stored metadata.

9. The method of claim 7, wherein the request information is categorized after determining whether information in the data communication corresponds to an entry in a list.

10. The method of claim 1, wherein processing the data communication based on information in the data communication comprises determining whether the data communication should be continued or discontinued based on whether information in the data communication corresponds to an entry in a list.

11. The method of claim 10, wherein the list comprises a black list and the data communication is discontinued if information in the data communication corresponds to an entry in the black list.

12. The method of claim 11, wherein discontinuing the data communication comprises responding to the data communication with a reply indicating that a request associated with the data communication is denied.

13. The method of claim 10, wherein the list comprises a white list and the data communication is continued if information in the data communication corresponds to an entry in the white list.

14. The method of claim 10, wherein the entry in the list indicates whether the data communication should be continued or discontinued based on a determined identity of a subscriber associated with the data communication.

15. The method of claim 1, wherein processing the data communication comprises processing the data communication based on a determined identity of a subscriber associated with the data communication.

16. The method of claim 1, wherein detecting the event comprises detecting a request for access to a resource.

17. The method of claim 16, wherein the request comprises at least a portion of a uniform resource locator.

18. The method of claim 16, wherein detecting the request comprises identifying a data packet in a flow of data packets.

19. The method of claim 16, wherein detecting the request comprises transforming a request string to generate information identifying the resource.

20. The method of claim 19, wherein the request string comprises an address corresponding to a cache storing content associated with the resource.

21. The method of claim 16, wherein detecting the request comprises detecting a request for access to a resource identified as illegal content.

22. The method of claim 21, wherein the request is detected at communication protocol layers implemented in hardware without the need for assistance from communication protocol layers implemented in software.

23. The method of claim 1, wherein detecting the event comprises detecting a protocol state based on characteristics of the data communication.

24. The method of claim 23, wherein detecting the event comprises detecting a protocol state based on protocol information in a header of a packet of the data communication.

25. The method of claim 23, wherein detecting the event comprises detecting a protocol state based on protocol information in a payload of a packet of the data communication.

26. The method of claim 25, wherein the protocol information in the payload of the packet comprises application layer protocol information.

27. The method of claim 23, wherein detecting the event comprises detecting states of a Hyper Text Transport Protocol (HTTP).

28. The method of claim 23, wherein detecting the event comprises detecting states of a Wireless Application Protocol (WAP).

29. The method of claim 1, wherein the data communication comprises a flow of packets.

30. The method of claim 29, wherein the flow of packets comprises Internet Protocol (IP) packets.

31. A communication node for processing data communication passing through the node between a first data network and a second data network, the node comprising:
means for detecting an event associated with data communication arriving at the node from the first data network;
means for determining whether the data communication is to be suspended for service at the node based on the detected event;
means for processing suspended data communication based on information in the data communication; and
means for detecting return data communication arriving at the node from the second data network in response to the processed data communication from the first data network, and allowing the detected return data communication to pass through the node without processing the detected return data communication.

32. The communication node of claim 31, wherein the event is detected at communication protocol layers implemented in hardware without the need for assistance from communication protocol layers implemented in software.

33. The communication node of claim 31, wherein the event is detected without requiring processing to terminate or establish a communication session associated with the data communication.

34. A communication node for processing data communication passing through the node between a first data network and a second data network, the node comprising:
a packet inspection engine including circuitry to
detect an event associated with data communication arriving at the node from the first data network, and
determine whether the data communication is to be suspended for service at the node based on the detected event; and
a content filtering engine including circuitry to process suspended data communication based on information in the data communication;
wherein the packet inspection engine is configured to detect return data communication arriving at the node from the second data network in response to the processed data communication from the first data network, and allow the detected return data communication to pass through the node without processing the detected return data communication in the content filtering engine.

35. The communication node of claim 34, wherein the event is detected at communication protocol layers implemented in hardware without the need for assistance from communication protocol layers implemented in software.

36. The communication node of claim 34, wherein the event is detected without requiring processing to terminate or establish a communication session associated with the data communication.

* * * * *

UNITED STATES PATENT AND TRADEMARK OFFICE
CERTIFICATE OF CORRECTION

PATENT NO. : 7,586,871 B2  Page 1 of 1
APPLICATION NO. : 11/330588
DATED : September 8, 2009
INVENTOR(S) : Hamilton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Twenty-first Day of September, 2010

David J. Kappos
*Director of the United States Patent and Trademark Office*